US012441112B2

(12) United States Patent
Kawagoe

(10) Patent No.: US 12,441,112 B2
(45) Date of Patent: Oct. 14, 2025

(54) LIQUID DISCHARGING APPARATUS

(71) Applicant: BROTHER KOGYO KABUSHIKI KAISHA, Nagoya (JP)

(72) Inventor: Masako Kawagoe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 210 days.

(21) Appl. No.: 18/334,415

(22) Filed: Jun. 14, 2023

(65) Prior Publication Data

US 2024/0001676 A1 Jan. 4, 2024

(30) Foreign Application Priority Data

Jun. 30, 2022 (JP) ................................ 2022-105649

(51) Int. Cl.
*B41J 2/165* (2006.01)

(52) U.S. Cl.
CPC ....... *B41J 2/16517* (2013.01); *B41J 2/16508* (2013.01); *B41J 2/16523* (2013.01)

(58) Field of Classification Search
CPC ......................... B41J 2/16517; B41J 2/16508; B41J 2/16532; B41J 2/16523
See application file for complete search history.

(56) References Cited

U.S. PATENT DOCUMENTS

2020/0290380 A1* 9/2020 Miyagawa ............. B41J 25/006
2020/0290381 A1 9/2020 Yoda et al.
2021/0283918 A1 9/2021 Takabayashi et al.
2023/0311519 A1* 10/2023 Kobayashi ........... B41J 2/16532 347/36

FOREIGN PATENT DOCUMENTS

JP 2020-146920 A 9/2020
JP 2021-142675 A 9/2021

* cited by examiner

*Primary Examiner* — Sharon Polk
(74) *Attorney, Agent, or Firm* — Merchant & Gould P.C.

(57) ABSTRACT

There is provided a liquid discharging apparatus including: a housing; a head having a nozzle configured to discharge a liquid to a printing medium; and a waste liquid box configured to store a waste liquid of the liquid. The housing has a first opening configured to eject the printing medium, the first opening being arranged in a front-surface of the housing. The waste liquid box is configured to be inserted into and drawn from the housing via the front-surface of the housing. In a state that the waste liquid box is installed in the housing: at least a portion of the waste liquid box is positioned in front of a printing area in which the nozzle of the head is arranged.

20 Claims, 22 Drawing Sheets

LIQUID DISCHARGING APPARATUS

REFERENCE TO RELATED APPLICATIONS

This application claims priority from Japanese Patent Application No. 2022-105649 filed on Jun. 30, 2022. The entire content of the priority application is incorporated herein by reference.

BACKGROUND ART

Conventionally, ink-jet printers are provided with a waste liquid box configured to store a waste liquid. In a printer configured such that the waste liquid box is taken out from a back-surface of the printer, efficiency of work for replacing the waste liquid box is deteriorated. In view of such situation, it is proposed, for example, a printer configured such that the waste liquid box is taken out from the printer by opening an upper-surface of the printer.

DESCRIPTION

However, a model (type) of which flat-bed cover (FB cover) cannot be opened upwardly is included among printers designed such that a weight of the product (that is, the printer) is saved by reducing a number of members for protecting an ink engine (a printer engine; image forming part such as recording part). A technique of Japanese Patent Application Laid-open No. 2020-146920 has such a problem as described below. That is, if the technique of Japanese Patent Application Laid-open No. 2020-146920 is applied to a printer of the model of which flat-bed cover cannot be opened upwardly, the waste liquid box cannot be replaced.

The present disclosure is made for resolving a problem described above. An object of the present disclosure is to provide a liquid discharging apparatus capable of inserting and drawing a waste liquid box with respect to the liquid discharging apparatus easily, even in a case that accessing the waste liquid box from an upper-surface of the liquid discharging apparatus such as a printer etc. is difficult.

According to a first aspect of the present disclosure, there is provided a liquid discharging apparatus including: a housing; a head having a nozzle configured to discharge a liquid to a printing medium; and a waste liquid box configured to be inserted into and drawn from the housing, the waste liquid box being configured to store a waste liquid of the liquid. The housing has a first opening configured to eject the printing medium via the first opening, the first opening being arranged in a front-surface of the housing, a front-rear direction of the housing being a direction parallel with a conveying direction along which the printing medium is conveyed. The waste liquid box is configured to be inserted into and drawn from the housing via the front-surface of the housing. In a state that the waste liquid box is installed in the housing: at least a portion of the waste liquid box is positioned in front of a printing area being an area in which the nozzle of the head is arranged.

According to one aspect of the present disclosure, the waste liquid box can be inserted and drawn with respect to the liquid discharging apparatus easily, even in a case that accessing the waste liquid box from the upper-surface of the liquid discharging apparatus such as a printer etc. is difficult.

FIRST EMBODIMENT

In the following, an ink-jet printer 1 according to the first embodiment of the present disclosure will be described with reference to FIG. 1 to FIG. 7.

[Schematic Configuration of the Ink-Jet Printer]

Figure 1:
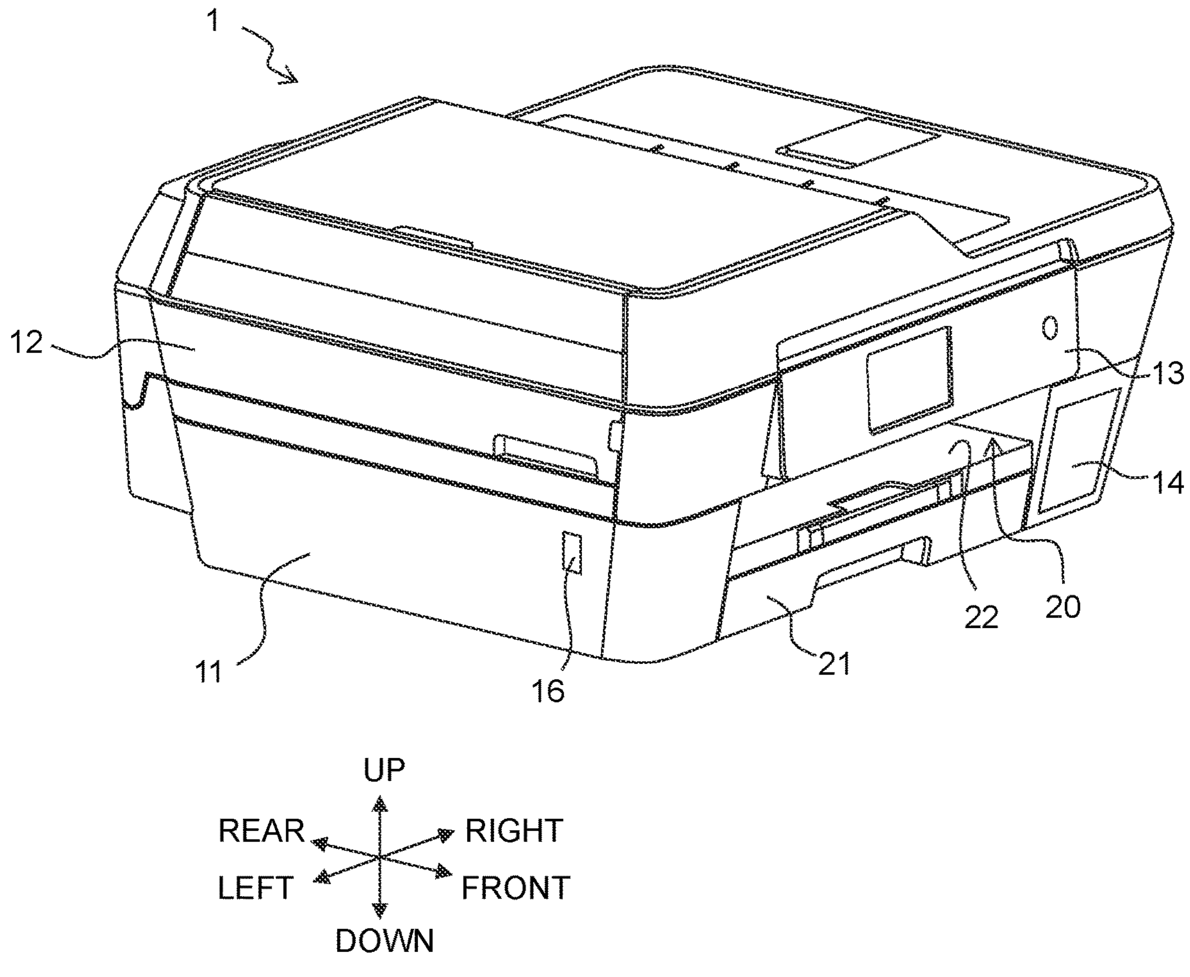
FIG. 1 is an example of an outside perspective view of an ink-jet printer.

FIG. 1 is an example of an outside perspective view of the ink-jet printer 1. As depicted in FIG. 1, the ink-jet printer 1 includes a housing 11, a reading unit 12, and an operation panel 13. The housing 11 has a substantially cuboid shape.

The reading unit (reader) 12 is arranged above the housing 11, and reads an object (a reading object) such as for example an image recorded on a sheet P. The reading unit 12 is provided such that the reading unit 12 is rotatable relative to the housing 11 about a rotation axis being a hinge (not depicted).

The operation panel 13 is a configuration via which operations by a user is inputted. The operation panel 13 is provided on a front-surface of the housing 11, and has various operation buttons and a liquid crystal display. In the following, an up-down direction, a left-right direction, and a front-rear direction of the ink-jet printer 1 is defined as depicted by arrows in FIG. 1. In the present disclosure, the front-rear direction is a direction parallel with a conveying direction along which the sheet P is conveyed in the housing 11. The front-surface is a surface of the housing 11 having a first opening 20.

The ink-jet printer 1 is an example of a liquid discharging apparatus. The ink-jet printer 1 has a printing function of an ink-jet system in which a print data indicated by a print job is printed on the sheet P by discharging (ejecting) an ink L. The ink L is an example of a liquid. The image to be printed on the sheet P may be an image capable of color printing or may be an image dedicated for monochrome printing. The sheet P is, for example, a paper (a plain paper) having A4-size. Note that the sheet P may be a thick paper, a thin paper, other than the plain paper. The sheet P is an example of a printing medium of the disclosure.

The first opening 20 is formed on the front-surface of the ink-jet printer 1. Each of a feeding tray 21 and an ejecting (discharging) tray 22 is detachably arranged in the first opening 20. The feeding tray 21 is an accommodating part for accommodating a plurality of pieces of the sheet P, and is opened upwardly. The ejecting tray 22 is arranged above the feeding tray 21. The ejecting tray 22 is an ejecting part to which the sheet P on which the image is printed is to be ejected. In other words, the housing 11 has the first opening 20 via which the sheet P is ejected.

A cover 14 is provided in the front-surface of the housing 11. The cover 14 is provided such that the cover 14 is rotatable relative to the housing 11. In an area in the housing 11 positioned behind the cover 14, ink cartridges 141 installed into a cartridge case 140 are arranged (see, FIG. 3).

The operation panel 13 is configured such that the operation panel 13 is rotatable relative to the housing 11. A waste liquid box 60 (see, FIG. 3) is provided behind the operation panel 13. The waste liquid box 60 is, for example, a tank having a rectangular box shape. The waste liquid box 60 is provided such that the waste liquid box 60 is capable of being inserted into the housing 11 and capable of being drawn from the housing 11, and is configured to store a waste liquid of a liquid. The waste liquid box 60 is an example of a waste liquid box of the present disclosure. The waste liquid box 60 is configured such that the waste liquid box 60 is inserted into and drawn from the housing 11 via the front-surface of the housing 11. In an example depicted in FIG. 1, it is possible to insert and draw the waste liquid box 60 with respect to the housing 11 via the front-surface of the housing 11, by opening the operation panel 13.

A connecting port 16 for connecting an external device to the ink-jet printer 1 is arranged at the front-part of the light-side-surface of the housing 11. Examples of the external device are an USB memory, PC, etc.

[Internal Configuration of the Ink-Jet Printer]

Figure 2:
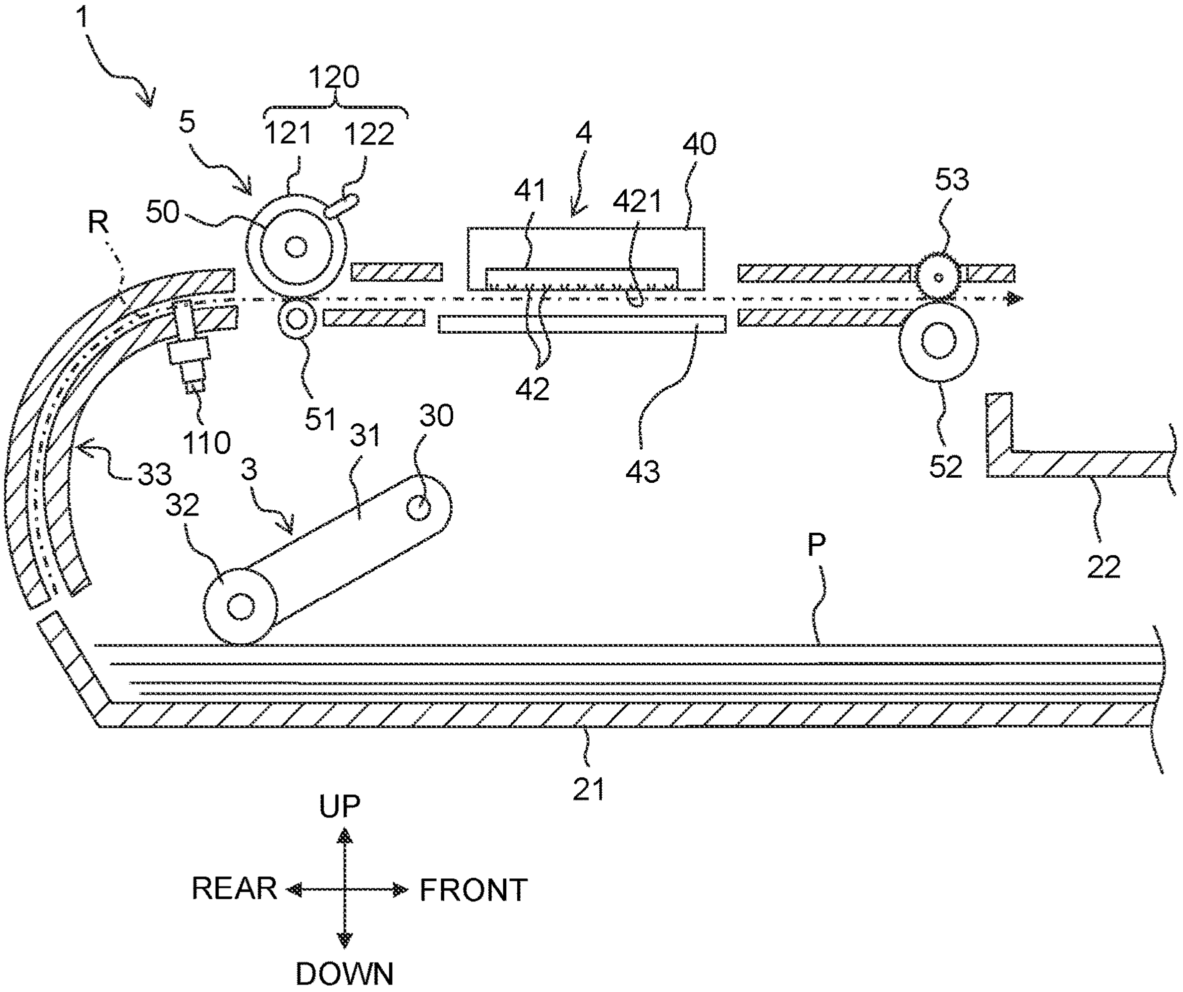
FIG. 2 is a view depicting an internal configuration of the ink-jet printer in an area around a recording unit.

Next, an internal configuration of the ink-jet printer 1 will be described with reference to FIG. 2 and FIG. 3. FIG. 2 is a cross-sectional view depicting the internal configuration of the ink-jet printer 1 in the area around the recording unit 4. As depicted in FIG. 2, the ink-jet printer 1 includes a feeding unit 3, a conveying route R, the recording unit 4, and the conveying unit 5.

The feeding unit 3 includes a shaft 30, a feeding arm 31, and a feeding roller 32. The feeding roller 32 is configured to feed the sheet P accommodated in the feeding tray 21 to the conveying route R. The feeding roller 32 is rotatably supported by the tip of the feeding arm 31. The feeding arm 31 is rotatably supported by the shaft 30 supported by a frame of the ink-jet printer 1.

The conveying route R is a route (path) which extends upwardly from the rear end of the feeding tray 21, curves in a region defined by a guide member 33, and reaches the ejecting tray 22 via a position where the recording unit 4 is arranged. The feeding roller 32 rotates positively, based on driving of a feeding motor 107 (see, FIG. 4), so as to take out the sheet P, one by one, from the feeding tray 21. The sheet P taken out from the feeding tray 21 is conveyed to the recording unit 4 along the conveying route R.

The recording unit 4 is arranged above the feeding unit 3. The recording unit 4 is configured to record an image on the sheet P. The recording unit 4 includes a carriage 40, a liquid discharging head 41, a plurality of nozzles 42, and a platen 43. The carriage 40 is moved back and forth in the left-right direction (that is, in a scanning direction) via transmission of driving force of a carriage motor 112 (see, FIG. 4).

The liquid discharging head 41 is mounted on the carriage 40. A plurality of nozzles 42 is provided on the lower-surface of the liquid discharging head 41. The plurality of nozzles 42 is arranged in the front-rear direction so as to construct a nozzle row. Four nozzle rows arranged in the scanning direction are formed in the nozzle surface 421.

A yellow (Y) ink is discharged from the plurality of nozzles 42 constructing the rightmost nozzle row. A cyan (C) ink is discharged from the plurality of nozzles 42 constructing the second nozzle row from the right. A magenta (M) ink is discharged from the plurality of nozzles 42 constructing the third nozzle row from the right. A black (K) ink is discharged from the plurality of nozzles 42 constructing the leftmost nozzle row. Note that an arrangement order of the nozzle rows is not limited thereto, and may be changed product by product.

The liquid discharging head 41 includes the nozzles 42 configured to discharge the liquid to the sheet P. The liquid discharging head 41 is configured to discharges the ink droplets from the nozzles 42 by oscillating an oscillating element such as a piezoelectric element. The platen 43 is arranged below the liquid discharging head 41. The platen 42 extends over the total length in the scanning direction of the sheet P. During a recording process, the platen 43 supports the sheet P from a position below the sheet P.

The platen 43 is a member having a rectangular plate shape on which the sheet P is to be placed. In a process in which the carriage 40 is moved, the liquid discharging head 41 selectively discharges the ink droplets to the sheet P supported by the platen 43, and thus the image is formed on the sheet P.

The conveying unit 5 includes a conveying roller 50 and an ejecting (discharging) roller 52. The conveying roller 50 and the ejecting roller 52 are arranged such that the recording unit 4 is interposed between the conveying roller 50 and the ejecting roller 52 in the front-rear direction. The conveying roller 50 is driven by a conveying motor 108.

A pinch roller 51 is provided at a position below the conveying roller 50 and facing the conveying roller 50. The pinch roller 51 rotates following the rotation of the conveying roller 50. In a case that the conveying roller 50 and the pinch roller 51 are rotated positively, the sheet P is conveyed to the recording unit 4 along the conveying route R in a state that the sheet P is pinched by the conveying roller 50 and the pinch roller 51.

The ejecting roller 52 is provided at a position in the conveying route R downstream of the recording unit 4. A spur roller 53 is provided at a position above the ejecting roller 52 and facing the ejecting roller 52. The ejecting roller 52 is driven by the conveying motor 108. The spur roller 53 rotates following the rotation of the ejecting roller 52. In a case that the ejecting roller 52 and the spur roller 53 are rotated positively, the sheet P is ejected (discharged) to the ejecting tray 22 in a state that the sheet P is pinched by the ejecting roller 52 and the spur roller 53. The ejecting roller 52 and the spur roller 53 are an example of an ejecting roller pair of the present disclosure.

A register sensor 110 is provided at a position in the conveying route R upstream of the conveying roller 50. The register sensor 110 is a sensor configured to detect a situation that the front end or the rear end of the sheet P passes an abutting position where the sheet P abuts (makes contact with) the conveying roller 50. A sensor having an actuator configured to swing based on abutting of the sheet P to the actuator, a photo sensor, and the like may be used as the register sensor 110.

In a state that the sheet P is moving through a position where the register sensor 110 is arranged, the register sensor 110 outputs ON signal. In a state that the sheet P is not moving through the position where the register sensor 110 is arranged, the register sensor 110 outputs OFF signal. That is, the register sensor 110 outputs ON signal from a timing when the front end of the sheet P reaches the position where the register sensor 110 is arranged until a timing when the rear end of the sheet P moves through the position where the register sensor 110 is arranged, and outputs OFF signal in a time period other such time period. A detecting signal of the register sensor 110 is outputted to the controller 100 (see, FIG. 4).

A rotary encoder 120 configured to detect rotation of the conveying roller 50 is provided on the conveying roller 50. The rotary encoder 120 outputs a pulse signal to the controller 100 depending on the rotation of the conveying roller 50. The rotary encoder 120 includes an encoder disk 121, and an optical sensor 122. The encoder disk 121 rotates together with the conveying roller 50. The optical sensor 122 reads the rotating encoder disk 121 so as to generate the pulse signal, and output the generated pulse signal to the controller 100.

Figure 3:
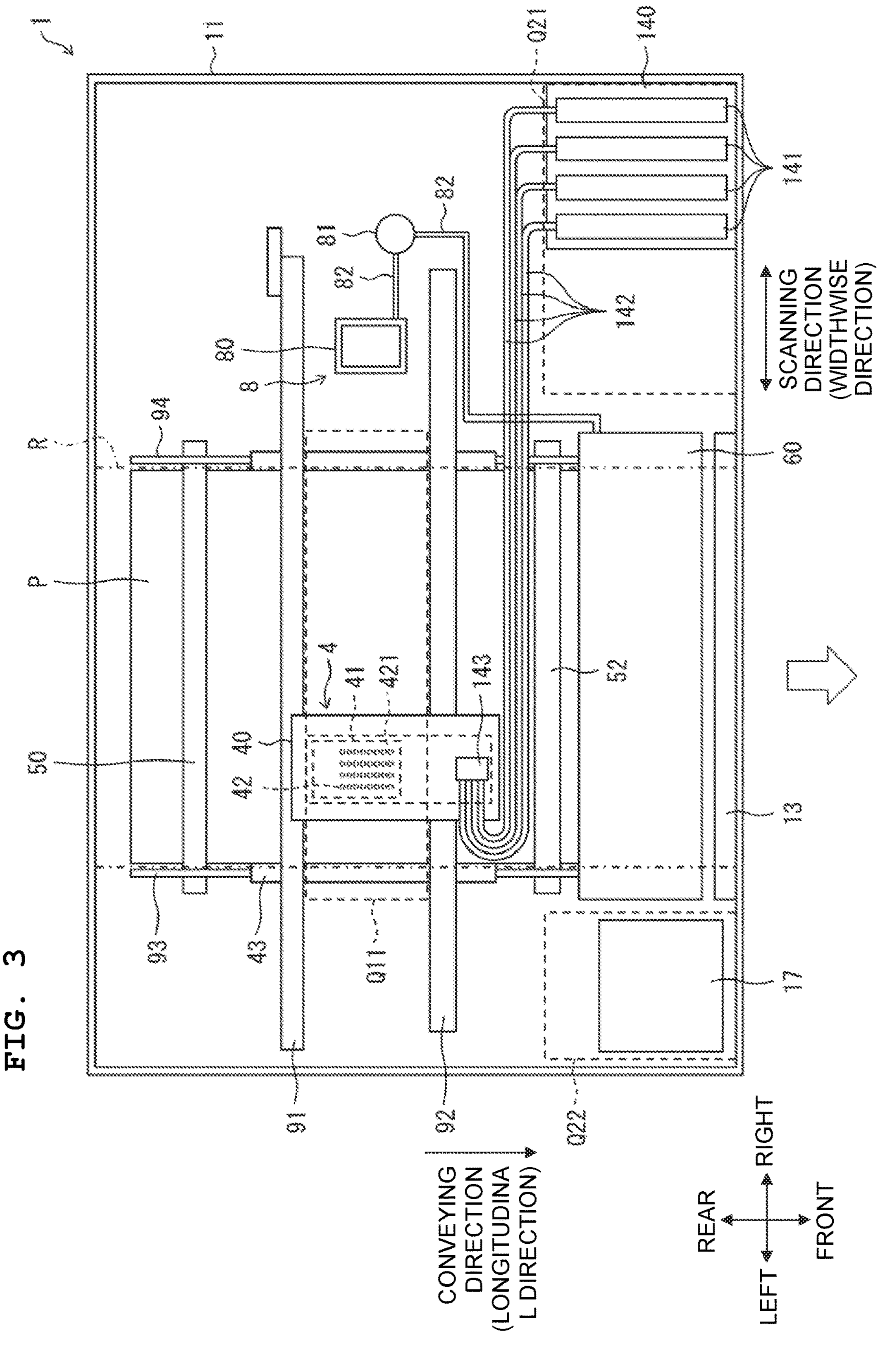
FIG. 3 is a view seeing the area around the recording unit of the ink-jet printer from above.

FIG. 3 is a view seeing the area around the recording unit 4 of the ink-jet printer 1 from above. As depicted in FIG. 3, the ink L is supplied from the ink cartridges 141 to the recording unit 4 via supply tubes 142. The ink L supplied from the ink cartridges 141 is stored in buffer tanks (depiction omitted) of the recording unit 4. The insides of the buffer tanks are in communication with the plurality of nozzles 42.

A tube joint 143 is provided integrally with the buffer tanks. One end of each of the four supply tubes 142 is detachably connected to the tube joint 143. The other end of each of the four supply tubes 142 is connected to one of the four ink cartridges 141.

As depicted in FIG. 3, two guide rails 91, 92 each extending in parallel with the scanning direction (the left-right direction of FIG. 3) is provided above the platen 43. The carriage 40 is attached to the two guide rails 91, 92. The carriage 40 is configured such that the carriage 40 is movable in the scanning direction along the two guide rails 91, 92 in an area in which the carriage 40 faces the platen 43. Note that the ink-jet printer 1 may include only one guide rail.

Two support frames 93, 94 are arranged below the two guide rails 91, 92. The two support frames 93, 94 each extend in the up-down direction of the housing 11, and are arranged apart from each other in the scanning direction. The support frame 93 supports the left-end-side of each of the two guide rails 91, 92, the conveying roller 50 and the ejecting roller 52. The support frame 94 supports the right-end-side of each of the two guide rails 91, 92, the conveying roller 50 and the ejecting roller 52. Note that the ink-jet printer 1 may include only one support frame.

A driving belt (depiction omitted) is attached to the carriage 40. The driving belt is an endless belt wound to span between two pullies (depiction omitted). One of the two pullies is connected to the carriage motor 112 (see, FIG. 4). Depending on the positive rotation or the inverse rotation of the carriage motor 112, the pulley connected to the carriage motor 112 rotates, and thus the driving belt runs. With this, the carriage 40 is moved in the scanning direction back and forth, and concurrently, the recording unit 4 mounted on the carriage 40 is moved in the scanning direction back and forth.

[Configuration of Maintenance Unit]

As depicted in FIG. 3, a maintenance unit 8 is arranged in right of the platen 43. The maintenance unit 8 includes a cap part 80, a pump 81, and a waste liquid tube 82. The maintenance unit 8 executes, as a maintenance process, a purge operation of sucking the waste liquid in the nozzles 42, such as the ink L. The waste liquid tube 82 transfers the waste liquid to the waste liquid box 60. The waste liquid tube 82 is an example of a waste liquid channel of the present disclosure.

The cap part 80 is made of, for example, a rubber material. During the maintenance process, the cap part 80 is arranged such that the cap part 80 is opposed to (faces) the liquid discharging head 41, and receives the waste liquid discharged from the nozzles 42. The pump 81 is driven by undepicted motor to suck the waste liquid in the nozzles 42, such as the ink L etc. The waste liquid tube 82 extends from the cap part 80 and reaches the waste liquid box 60 via the pump 81. The waste liquid sucked by the pump 81 is drained to the waste liquid box 60 via the waste liquid tube 82.

[Electrical Configuration of Ink Jet Printer 1]

Figure 4:
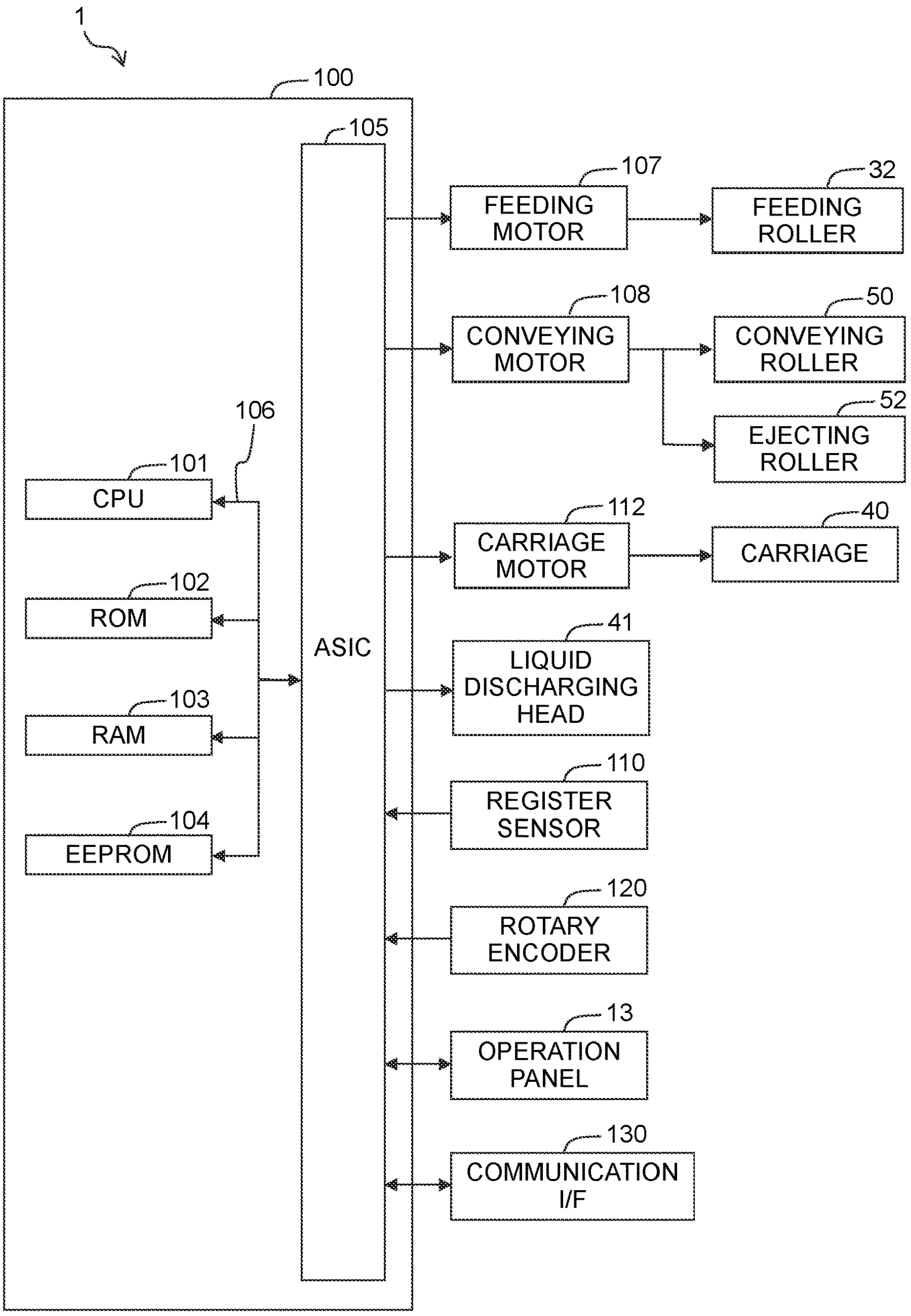
FIG. 4 is a block diagram depicting an electrical configuration of the ink-jet printer.

FIG. 4 is a block diagram depicting an electrical configuration of the ink-jet printer 1. As depicted in FIG. 4, the ink-jet printer 1 incudes, in addition to the parts described above, a controller 100, the feeding motor 107, the conveying motor 108, the carriage motor 112, and a communication interface (I/F) 130.

The controller 100 includes a CPU (Central Processing Unit) 101, a ROM (Read Only Memory) 102, a RAM (Random Access Memory) 103, an EEPROM (trade mark) 104, and an ASIC 105. The CPU 101, the ROM 102, the RAM 103, the EEPROM 104 and the ASIC 105 are connected via an internal bus 106.

A program for the CPU 101 to control various operations etc. is stored in the ROM 102. The RAM 103 is used as a memory area for temporarily recording data, signals etc., used when the CPU 101 executes above programs, or a working area for data processing.

EEPROM 104 stores setting information required to be maintained even after the power of the ink-jet printer 1 is switched off. The controller 100 controls the feeding motor 107, the conveying motor 108, the carriage motor 112, and the liquid discharging head 41 etc., based on a control program(s) read out from the ROM 102.

Each of the feeding motor 107, the conveying motor 108, the carriage motor 112, the liquid discharging head 41, the register sensor 110, the rotary encoder 120, the operation panel 13, and the communication I/F 130 etc. is connected to the ASIC 105.

The ASIC 105 supplies a driving current to the feeding motor 107, the conveying motor 108 and the carriage motor 112. The controller 100 controls the rotation of each of the feeding motor 107, the conveying motor 108 and the carriage motor 112 by, for example, a PWM (Pulse Width Modulation) control.

The controller 100 cause the nozzles 42 to discharge ink droplet by applying driving voltage to the oscillation elements of the liquid discharging head 41. Further, the controller 100 detects the situation that the sheet P has passed through the abutting position at which the sheet P abuts the conveying roller 50, based on a detecting signal outputted from the register sensor 110. Further, the controller 100 detects a rotation amount of the conveying roller 50 based on the pulse signal outputted from the rotary encoder 120.

The communication I/F 130 is connected to a network, such as LAN etc., so as to make it possible the connection between the ink-jet printer 1 and external devices, such as PC etc., in which a driver for the ink-jet printer 1 is installed. The ink-jet printer 1 is capable of receiving a print job via the communication I/F 130.

During the recording on the sheet P, the controller 100 records an image on the sheet P by discharging the ink L while moving the liquid discharging head 41 in the scanning direction together with the carriage 40, and while conveying the sheet P in the conveying direction with the conveying unit 5.

[Configuration of Waste Liquid Box]

Figure 5:
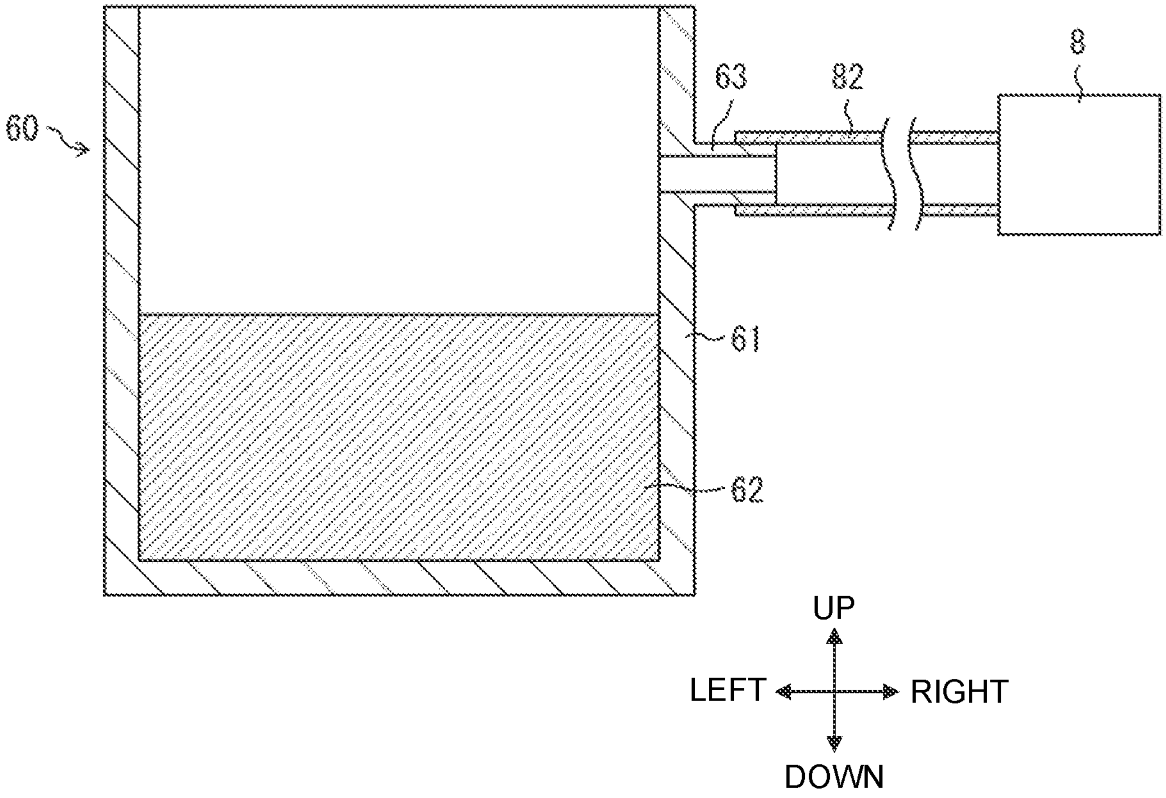
FIG. 5 is a cross-sectional view of a waste liquid box of the ink-jet printer.

Next, a configuration of the waste liquid box 60 will be described with reference to FIG. 3, FIG. 5, and FIG. 6. FIG. 5 is a cross-sectional view of the waste liquid box 60. As depicted in FIG. 5, the waste liquid box 60 includes a waste liquid case 61, a waste liquid absorbing body (absorber) 62, and a joint 63, and is configured to store the waste liquid. The waste liquid includes the ink L and a liquid other than the ink L, such as cleaning liquid, a shipping adjustment liquid, etc. discharged (drained) from the nozzle 42.

The waste liquid case 61 is a case which is made of a synthetic resin material etc., and which has a rectangular box shape opened upwardly. The waste liquid absorbing body 62 is arranged at the inside of the waste liquid case 61. The waste liquid absorbing body 62 is configured, for example, by a material capable of absorbing the waste liquid such as an unwoven fabric, a sponge, cotton, etc. The waste liquid absorbing body 62 absorbs the waste liquid, and thus the waste liquid box 60 store the waste liquid discharged (drained) from the nozzle 42.

The joint 63 is a part for connecting the waste liquid tube 82 to the waste liquid case 61. The joint 63 is provided on the right-side-surface of the waste liquid case 61 such that the joint 63 protrudes from the right-side-surface. By connecting the inner circumference of the waste liquid tube 82 to the outer circumference of the joint 63, the inside of the waste liquid case 61 and the inside of the waste liquid tube 82 are communicated with each other. With this, during the maintenance process, the waste liquid drained from the maintenance unit 8 is stored in the waste liquid box 60. Note that, as depicted in FIG. 3, the joint 63 is provided on the right-side-surface of the waste liquid case 61. However, there is no limitation thereto. The joint 63 may be provided on the rear-side-surface or the left-side-surface of the waste liquid case 61.

Figure 6:
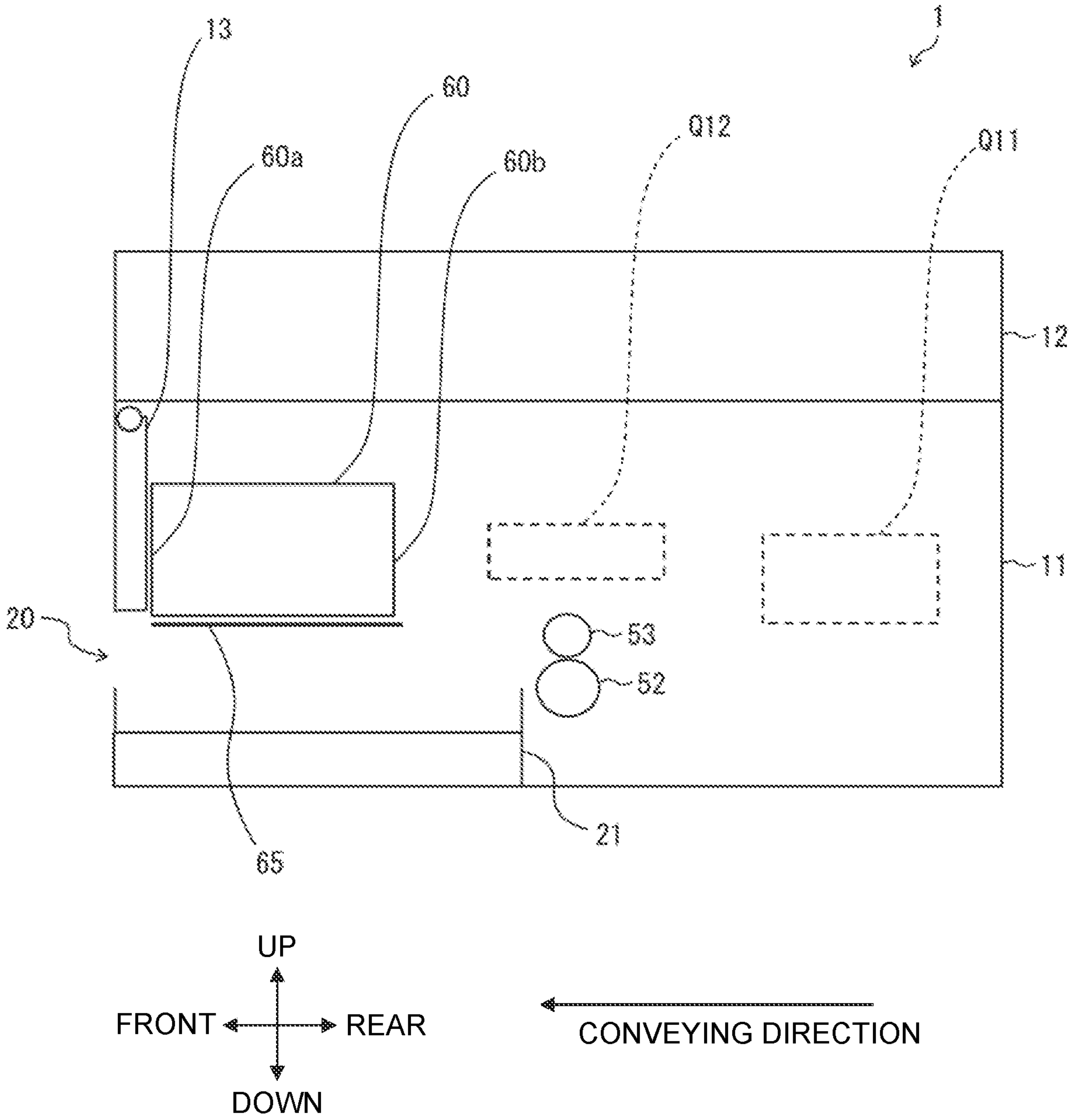
FIG. 6 is a schematic view seeing the ink-jet printer from right of the ink-jet printer.
Figure 7:
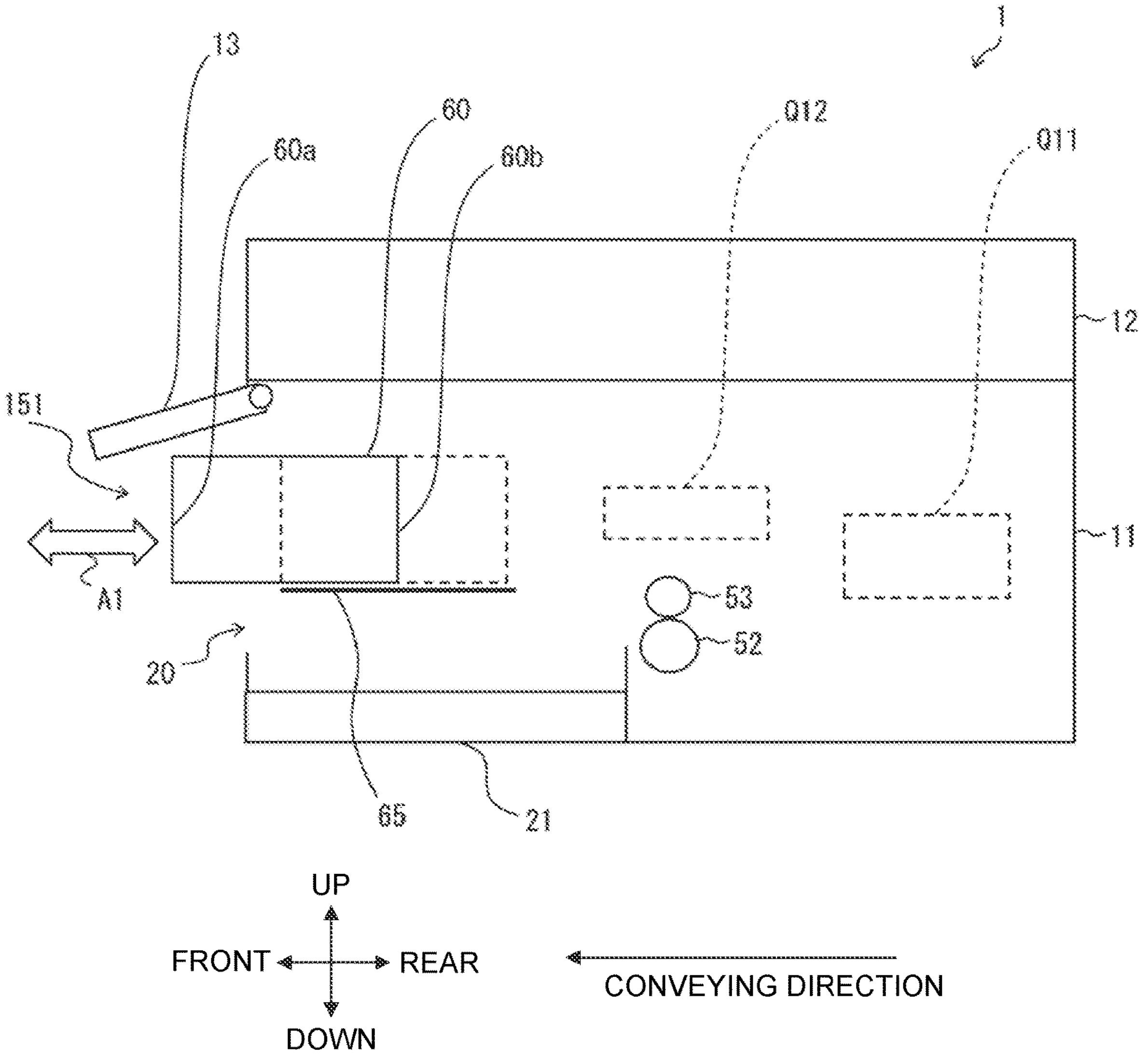
FIG. 7 is a schematic view seeing the ink-jet printer from right of the ink-jet printer.

FIG. 6 and FIG. 7 are schematic views seeing the ink-jet printer 1 from right of the ink-jet printer 1. FIG. 6 depicts a state in which the operation panel 13 is closed. FIG. 7 depicts a state in which the operation panel 13 is opened. In FIG. 6 and FIG. 7, a supporting part 65 supports the lower surface of the waste liquid box 60. Further, as depicted in FIG. 7, a second opening 151 is formed by rotating the operation panel 13. Note that, it is possible to adopt a configuration in which the second opening 151 is formed by rotating a portion of the housing 11 positioned behind the operation panel 13 together with the operation panel 13. The waste liquid box 60 is arranged such that the waste liquid box 60 can be inserted into and drawn from the housing 11 along the front-rear direction via the second opening 151 formed by rotating the operation panel 13. In other words, the front-surface of the housing 11 is configured such that a portion of the front-surface can be opened, and the waste liquid box 60 is inserted into and drawn from the housing 11 through the second opening 151 formed by opening the portion of the front-surface of the casing 11. That is, the waste liquid box 60 is arranged such that the liquid box 60 is capable of being inserted into and drawn from the housing 11 via the front-surface of the casing 11 along the arrow depicted in FIG. 3.

As depicted in FIG. 3 and FIG. 6, in a state that the waste liquid box 60 is installed in the housing 11, at least a portion of the waste liquid box 60 is positioned in front of a printing area Q11. Here, the printing area Q11 is an area in which the nozzles 42 of the liquid discharging head 41 moves in a scanning movement (that is, a movement of the liquid discharging head in the scanning direction). Further, as depicted in FIG. 3 and FIG. 6, the rear-surface 60*b* of the waste liquid box 60 is positioned in front of the printing area Q11. Note that the positional relationship between the waste liquid box 60 and the printing area Q11 is not limited to the example depicted in FIG. 3 and FIG. 6. The rear-surface 60*b* of the waste liquid box 60 may not be positioned in front of the printing area Q11. That is, the waste liquid box 60 may be arranged, in a state that the waste liquid box 60 is installed in the housing 11, such that the rear-surface 60*b* of the waste liquid box 60 overlaps with the printing area Q11 as seen from above.

As depicted in FIG. 6, in a state that the waste liquid box 60 is installed in the housing 11, the waste liquid box 60 is positioned in front of the area Q12 being a movable range of the supplying tubes 142. In a state that the waste liquid box 60 is installed in the housing 11, the front-surface 60*a* of the waste liquid box 60 is positioned in rear of the front-surface of the housing 11.

As depicted in FIG. 6 and FIG. 7, in a state that the waste liquid box 60 is installed in the housing 11, the lower-surface of the waste liquid box 60 is positioned above a pinching position where the ejecting roller pair (that is, the ejecting roller 52 and the spur roller 53) ejecting the sheep P pinches the sheet P.

As depicted in FIG. 3, the waste liquid box 60 installed in the housing 11 is positioned, in the left-right direction orthogonal to the front-rear direction, between a first area Q21 and a second area Q22. The first area Q21 is defined in right of the waste liquid box 60 so as to have a predetermined range. The second area Q22 is defined in left of the waste liquid box so as to have a predetermined range. In the example of FIG. 3, the ink cartridges 141 storing the ink L to be supplied to the liquid discharging 41 is arranged in the first area Q21. A control board 17 configured to control the ink-jet printer 1 is arranged in the second area Q22. The ink cartridge 141 storing the ink L to be supplied to the liquid discharging head 41 may be arranged at least one of the first area Q21 and the second area Q22. Here, the ink cartridge 141 is an example of a liquid container of the disclosure. Note that component(s) arranged in the first area Q21 and the second area Q22 is not limited to examples described above, and any other component(s) may be arranged in the first area Q21 or the second area Q22.

Effect of First Embodiment

The ink-jet printer 1 according to the first embodiment as described above includes the housing 11, the liquid discharging head 41 including the nozzles configured to discharge the liquid to the printing medium, the waste liquid box 60 which is capable of being inserted into and drawn from the housing 11 and which is configured to store the waste liquid of the liquid. The housing 11 has the first opening 20 via which the sheet P is ejected. The waste liquid box 60 is configured to be inserted into and drawn from the housing 11 via the front-surface of the housing 11 in a case that the direction in parallel with the conveying direction for the sheet P is defined as the front-rear direction of the housing 11 and the surface of the housing 11 having the first opening 20 is defined as the front-surface. In a state that the waste liquid box 60 is installed in the housing 11, at least a portion of the waste liquid box 60 is positioned in front of the printing area Q11 being an area in which the nozzles 42 of the liquid discharging head 41 moves while the scanning movement, and the lower-surface of the waste liquid box 60 is positioned above the pinching position where the ejecting roller 52 and the spur roller 53 ejecting the sheet P pinch the sheet P.

It is easy to take out the waste liquid box 60 via the front-surface of the housing 11 because at least a portion of the waste liquid box 60 is positioned in front of the printing area Q11. Further, the waste liquid box 60 does not obstruct a conveying route for the sheet P being ejected from the housing 11, because the lower surface of the waste liquid box 60 is positioned above the pinching (nipping) position where the ejecting roller 52 and the spur roller 53 pinch the sheet P (the pinching position where the ejecting roller pair pinches the sheet P). As a result, even in a case that the upper part of the housing 11 cannot be opened, it is possible to realize a configuration in which the waste liquid box 60 is inserted into and drawn from the housing 11 via the front-surface of the housing 11.

In the ink-jet printer 1, the rear-surface of the waste liquid box 60 is positioned in front of the printing area Q11. It is possible to make a distance between the liquid discharging head 41 and the reading unit 12 small, because the rear-surface of the waste liquid box 60 is positioned in front of the printing area Q11. As a result, a height of the housing 11 is reduced, and the ink-jet printer 1 can be downsized.

The front-surface of the housing 11 of the ink-jet printer 1 is configured such that a portion of the front-surface can be opened, and the waste liquid box 60 is inserted into and drawn from the housing 11 via the second opening 151 formed by opening the portion of the front-surface of the housing 11.

The second opening 151 via which the waste liquid box 60 is inserted into and drawn from the housing 11 is formed in the front-surface of the housing 11. It can be said the front-surface of the housing 11 is a position suitable for handling the waste liquid box 60 for inserting and drawing, because the front-surface of the housing 11 is positioned to face the user. Thus, it is possible to improve convenience for the user in inserting and drawing of the waste liquid box 60.

The ink-jet printer 1 further includes, in the front-surface of the housing 11, the operation panel 13 to which an operation of a user is inputted. The control panel 13 is configured to rotate with respect to the housing 11. By rotating the operation panel 13, the state in which the waste liquid box 60 can be inserted and drawn via the second opening 151 is realized.

Based on simple operation of rotating the operation panel 13, the state in which the waste liquid box 60 can be inserted and drawn with respect to the housing 11 via the front-surface of the housing 11 is realized. Thus, it is possible to further improve convenience for the user in inserting and drawing of the waste liquid box 60.

In the ink-jet printer 1, the waste liquid box 60 installed in the housing 11 is positioned, in the left-right direction, between the first area Q21 defined in right of the waste liquid box 60 to have a predetermined range and the second area Q22 defined in left of the waste liquid box 60 to have a predetermined range.

In the above configuration, the waste liquid box 60 is arranged substantially the center of the housing 11 in the left-right direction. As a result, spaces in the housing 11 defined in the right-side-area and the left-side-area of the housing 11 can be utilized more efficiently.

In the ink-jet printer 1, the ink cartridge 141 configured to store the ink L to be supplied to the liquid discharging head 41 is arranged in at least one of the first area Q21 and the second area Q22 (that is, in the first area Q21 and/or the second area Q22).

The ink cartridge 141 to which the user makes access each time he or she replenishes the ink is arranged in the first area Q21 or the second area Q22 close to the front-surface of the housing 11 like the waste liquid box 60. Further, the waste liquid box 60 and the ink cartridges 141 are arranged such that the waste liquid box 60 and the ink cartridges 141 are overlapped in the height direction (that is, the up-down direction). As a result, convenience of the user is improved, and the ink-jet printer 1 is downsized by reducing the height of the housing 11.

In a state that the waste liquid box 60 is installed in the housing 11, the front surface of the waste liquid box 60 is positioned behind the front surface of the housing 11. In such configuration, the front-surface of the waste liquid box 60 is positioned in rear of the front-surface of the housing 11, and thus the waste liquid box 60 does not protrude from the front-surface of the housing 11. As a result, the degree of freedom regarding exterior design of the housing 11 can be improved.

SECOND EMBODIMENT

An ink jet printer 1A according to a second embodiment of the present disclosure will be described with reference to drawings. Note that, for the convenience of the description, members having functions same as those of the members described in the above first embodiment, will be indicated by referential numerals same as those of the members in the first embodiment, and description therefor will not be repeated.

Figure 8:
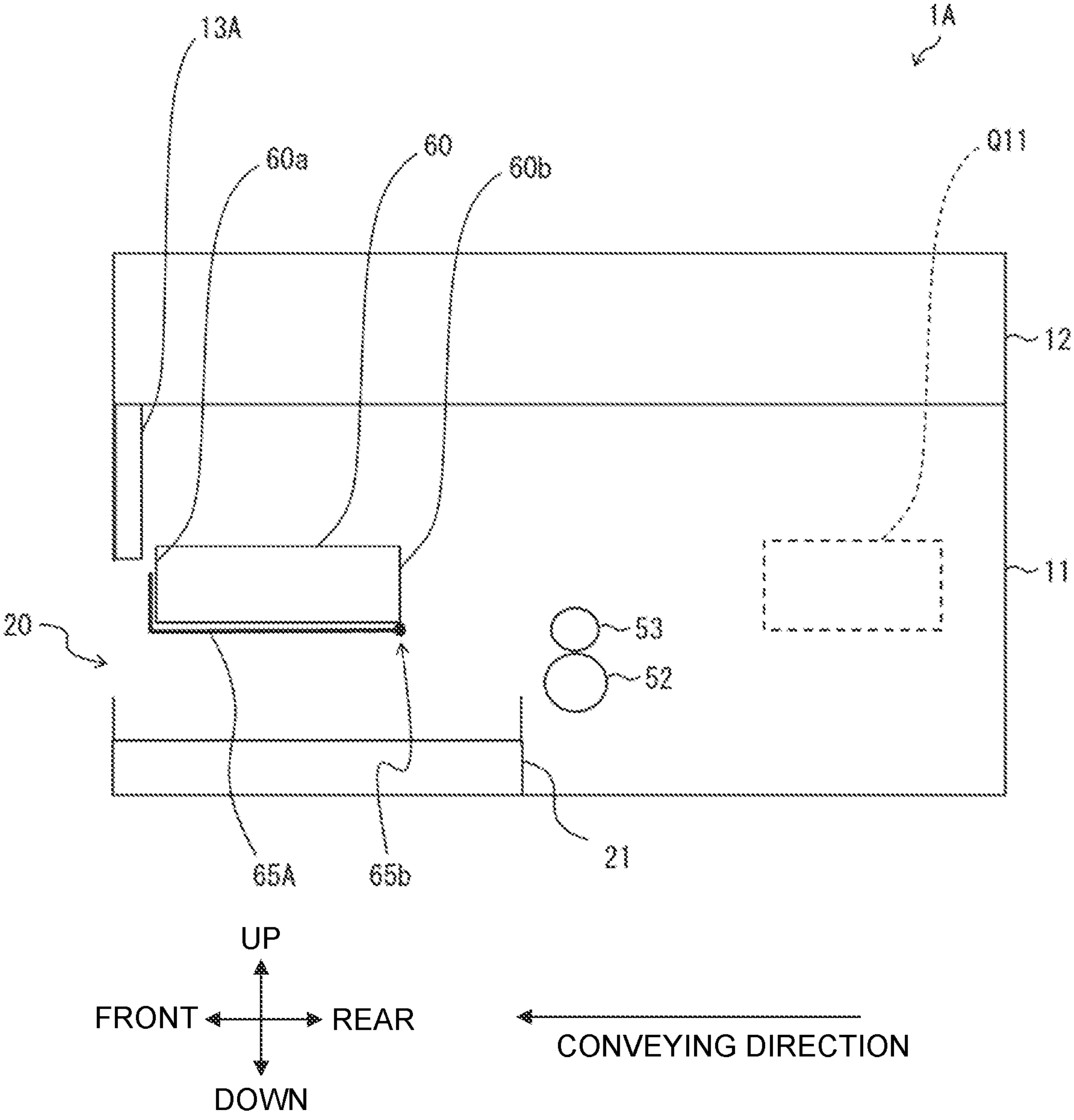
FIG. 8 is a schematic view seeing an ink-jet printer from right of the ink-jet printer.

FIG. 8 is a schematic view seeing the ink-jet printer 1A according to the second embodiment from right of the ink-jet printer 1A. The operation panel 13A of the ink-jet printer 1A is fixed to the housing 11, and does not rotate. The ink-jet printer 1A includes a supporting part 65A configured to support the lower-surface of the waste liquid box 60. The supporting part 65A is configured such that at least a portion of the supporting part 65A is openable. In the second embodiment, the waste liquid box 60 is inserted into and drawn from the housing 11 via an opening part formed by opening at least a portion of the supporting part 65A. Note that details of the opening part will be described in detail in a first configuration example to a third configuration example below.

Figure 9:
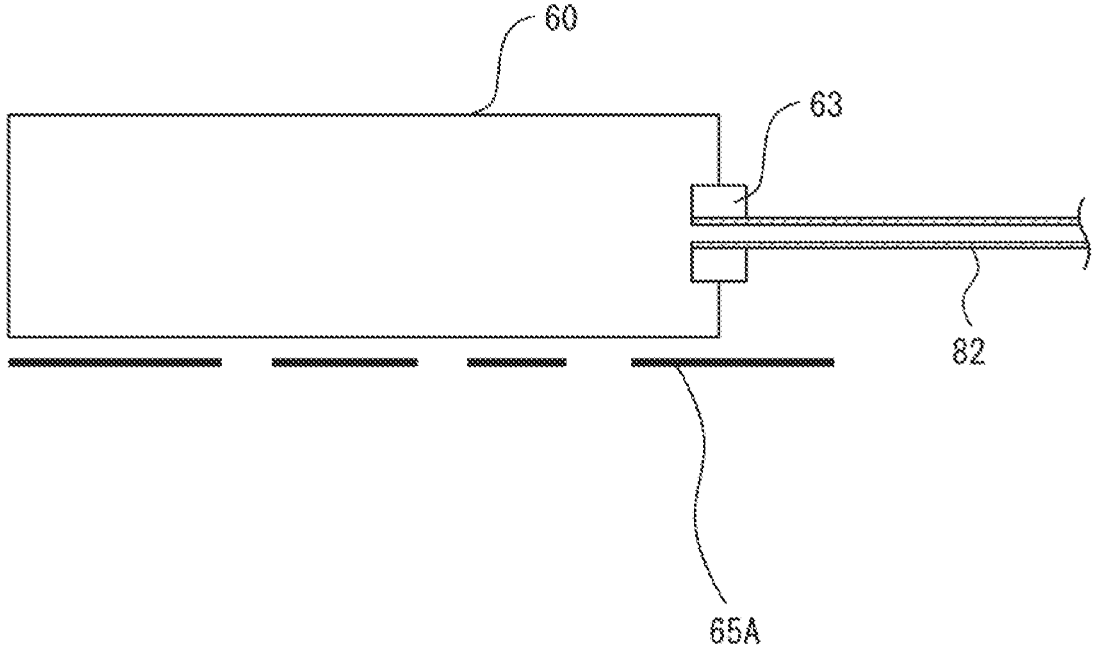
FIG. 9 is a view schematically depicting a waste liquid box and a supporting part.

FIG. 9 is a view schematically depicting the waste liquid box 60 and the supporting part 65A according to the second embodiment. In the example of FIG. 9, the supporting part 65A covers a portion of the bottom surface of the waste liquid box 60. The supporting part 65A is arranged such that the supporting part 65A at least covers the joint 63 from the below, the joint 63 connecting the waste liquid tube 82 and the waste liquid box 60.

Here, the first configuration example to the third configuration example of the supporting part 65A will be described with reference to the drawings. The first configuration example is an example in which the supporting part 65A is configured such that the supporting part 65A is capable of moving downwardly. The second configuration example is an example in which the supporting part 65A is configured such that the supporting part 65A is capable of rotate. The third configuration example is an example in which the supporting part 65A is configured such that a portion of the supporting part 65A is capable of rotating.

First Configuration Example

Figure 10:
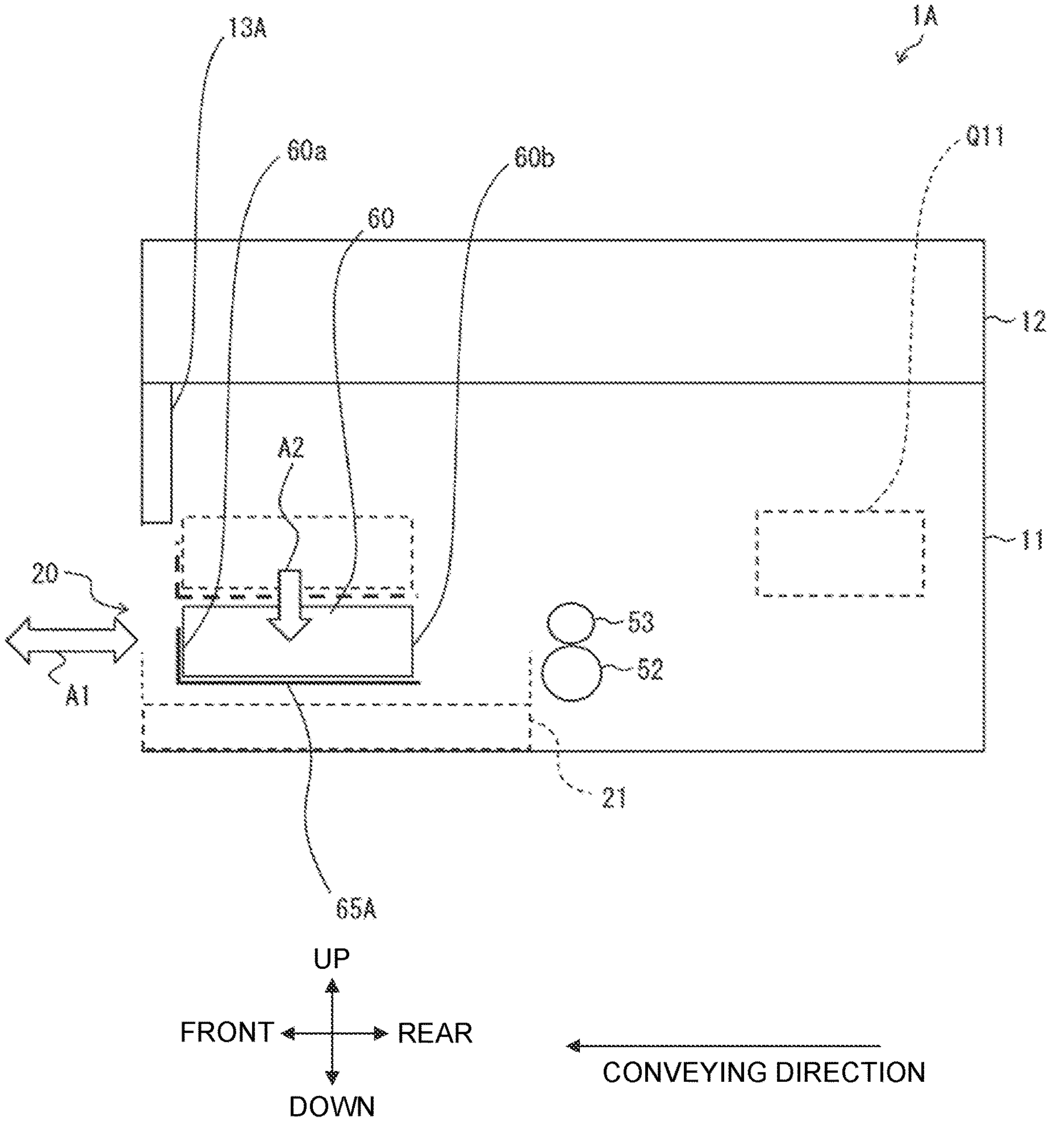
FIG. 10 is a view depicting a state in which the supporting part is moved.

FIG. 10 is a view depicting a state in which the supporting part 65A is moved downwardly (in a direction indicated by the arrow A2 in FIG. 10). By moving the supporting part 65A downwardly, the state in which the waste liquid box 60 can be inserted into and drawn from the housing 11 via the first opening 20 in the direction indicated by the allow A1 is realized. In a case that the waste liquid box 60 is inserted and drawn, the feeding tray 21 and the ejecting tray 22 may be removed.

Second Configuration Example

Figure 11:
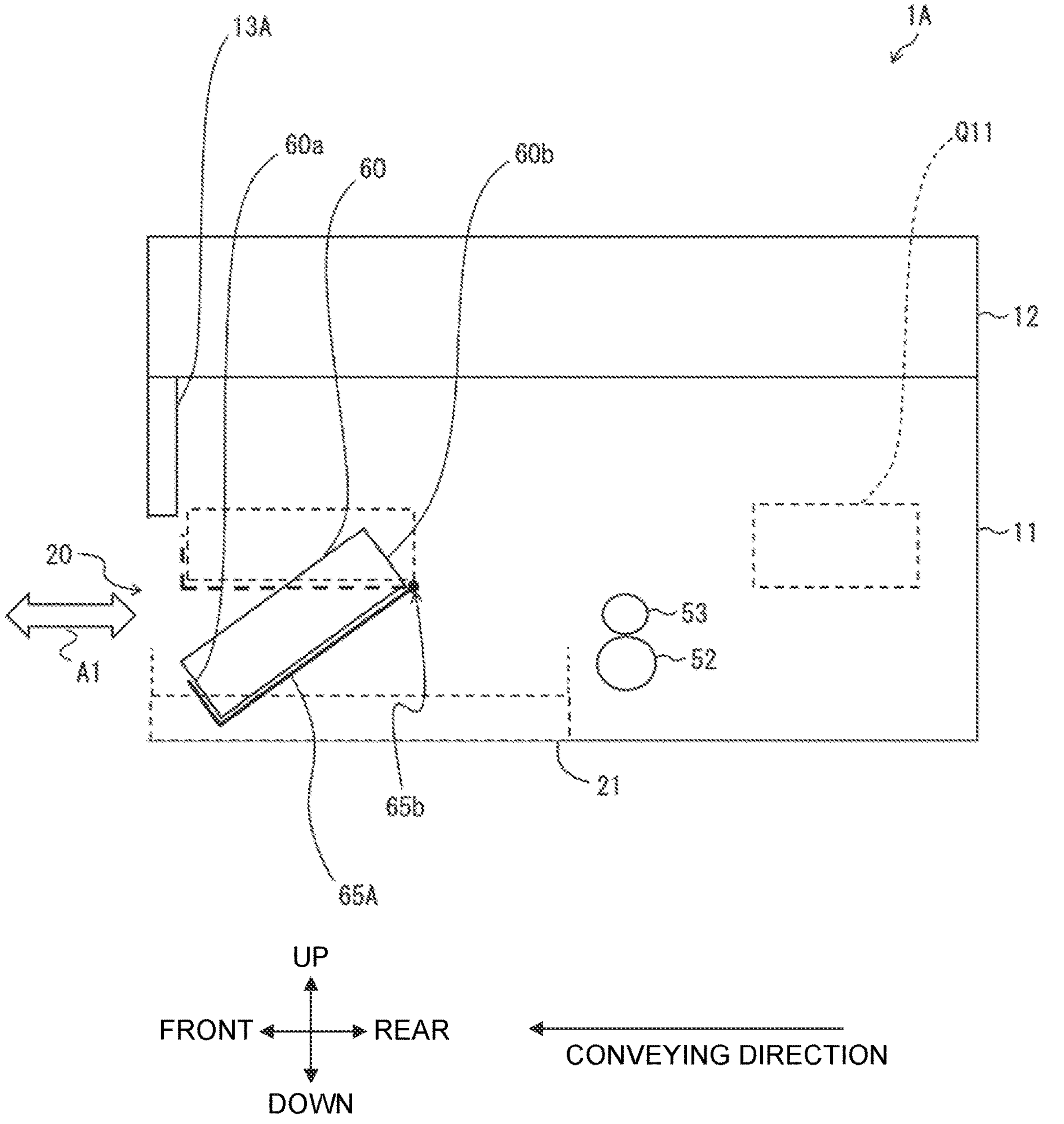
FIG. 11 is a view depicting a state in which the supporting part is rotated.

FIG. 11 is a view depicting a state in which the supporting part 65A is rotated about a rotation axis being the end part 65*b*. By rotating the supporting part 65A, the state in which the waste liquid box 60 can be inserted into and drawn from the housing 11 via the first opening 20 in the direction indicated by the allow A1 is realized. In a case that the waste liquid box 60 is inserted and drawn, the feeding tray 21 and the ejecting tray 22 may be removed.

Third Configuration Example

Figure 12:
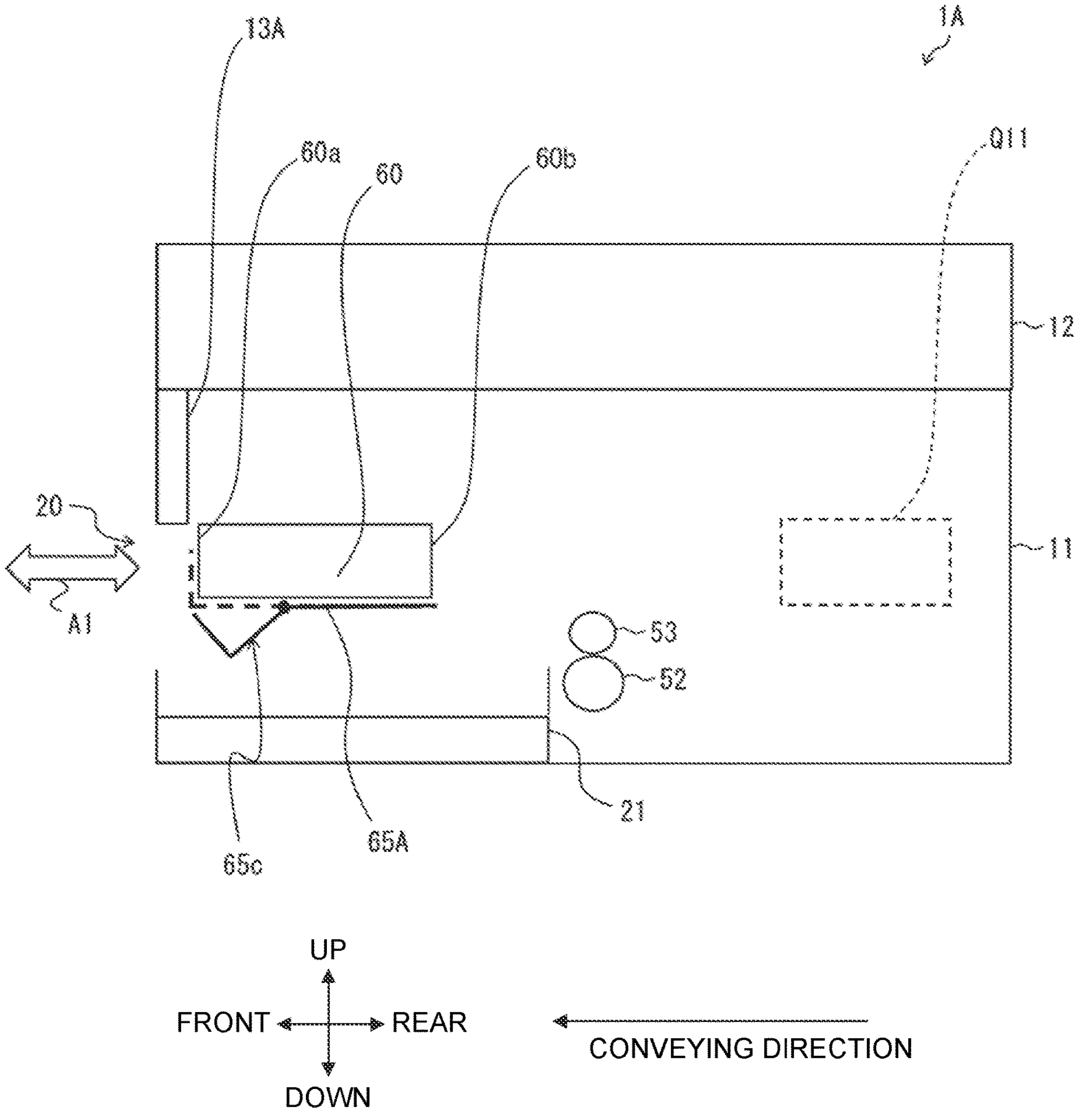
FIG. 12 is a view depicting a state in which a portion of the supporting part is rotated.

FIG. 12 is a view depicting a state in which a part 65*c* being a portion of the supporting part 65A is rotated. In this example, the part 65*c* of the supporting part 65A is rotated, and then the waste liquid box 60 inserted into and drawn from the housing 11 via the first opening 20 in the direction indicated by the allow A1. In a case that the waste liquid box 60 is inserted and drawn, the feeding tray 21 and the ejecting tray 22 may be removed.

As described above, the ink-jet printer 1A according to the second embodiment includes the supporting part 65A configured to support the lower-surface of the waste liquid box 60. The supporting part 65A is configured such that at least a portion of the supporting part 65A is openable. The waste liquid box 60 is inserted into and drawn from the housing 11 through the opening formed by opening at least a portion of the supporting part 65A.

Owing to the ink-jet printer 1A according to the second embodiment, it is possible to realize a configuration in which at least a portion of the supporting part 65 is opened, and then the waste liquid box 60 is taken out from the housing 11 by moving the waste liquid box 60 downwardly. With this, for example, even in a case that the ink-jet printer 1A does not have the operating panel 13 provided on the front-surface of the housing 11, or that the ink-jet printer 1A includes the operation panel 13 on the front-surface of the housing 11 fixed so that the opening panel 13 cannot be opened, the waste liquid box 60 can be inserted into and drawn from the housing 11 via the front-surface of the housing 11.

The ink-jet printer 1A according to the second embodiment includes the waste liquid tube 82 configured to transfer the waste liquid to the waste liquid box 60, and the supporting part 65A is arranged such that the supporting part 65A covers at least the joint 63 from the below, the joint 63 connecting the waste liquid tube 82 and the waste liquid box 60.

Owing to the ink-jet printer 1A according to the second embodiment, the joint 63 is covered by the supporting part 65A from the below, and thus the part of the waste liquid tube 82 at which leakage of the waste liquid is liable to occur can be covered from the below. As a result, it is possible to suppress adhesion of leaked waste liquid to the sheet P from occurring.

THIRD EMBODIMENT

An ink-jet printer 1B according to the third embodiment of the present disclosure will be described with reference to the drawings. Note that, for the convenience of the description, members having functions same as those of the members described in the above first embodiment and/or the second embodiment, will be indicated by referential numerals same as those of the members in the first embodiment and/or the second embodiment, and description therefor will not be repeated.

Figure 13:
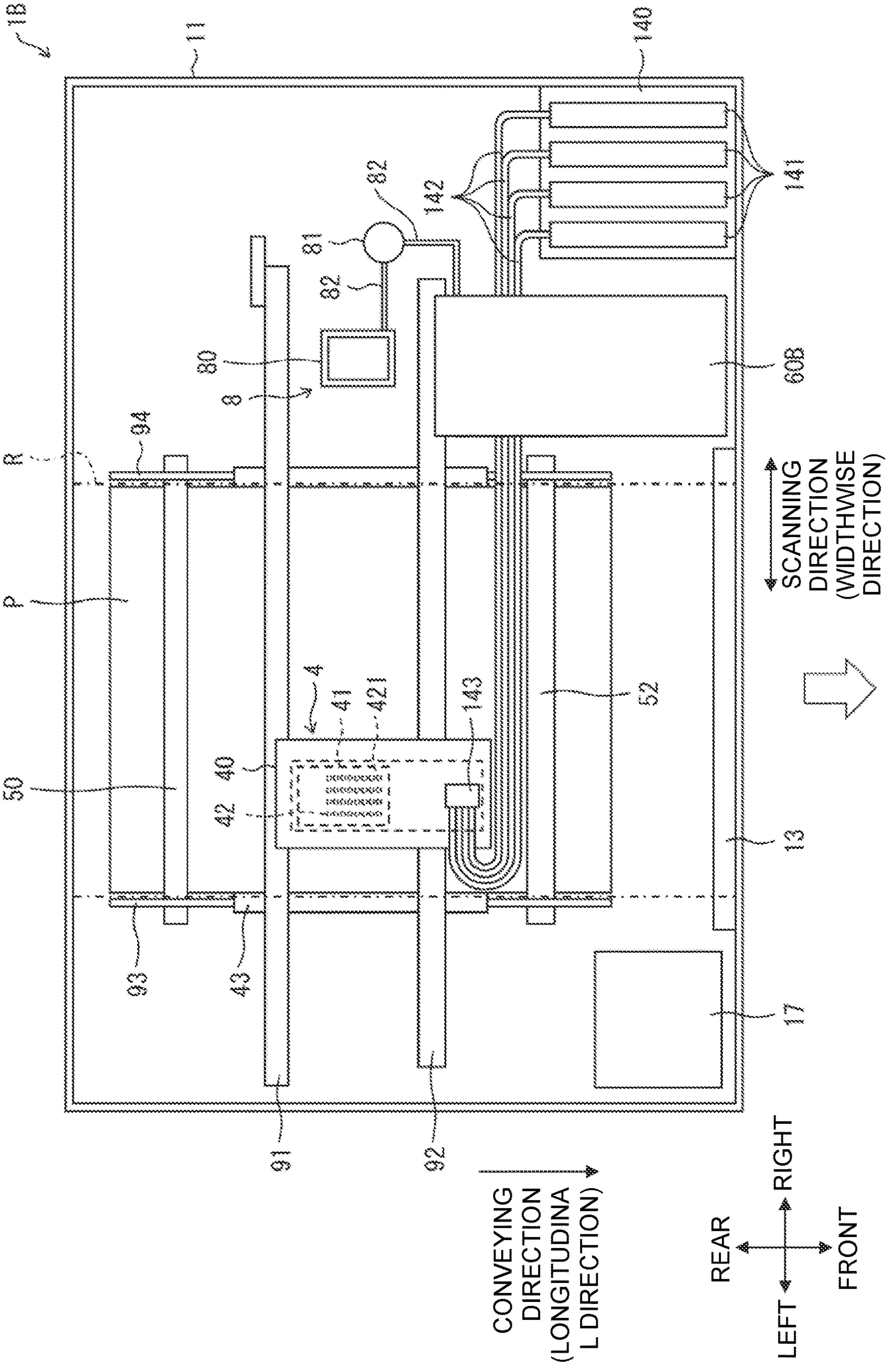
FIG. 13 is a view seeing an area around a recording unit of an ink-jet printer from above.
Figure 14:
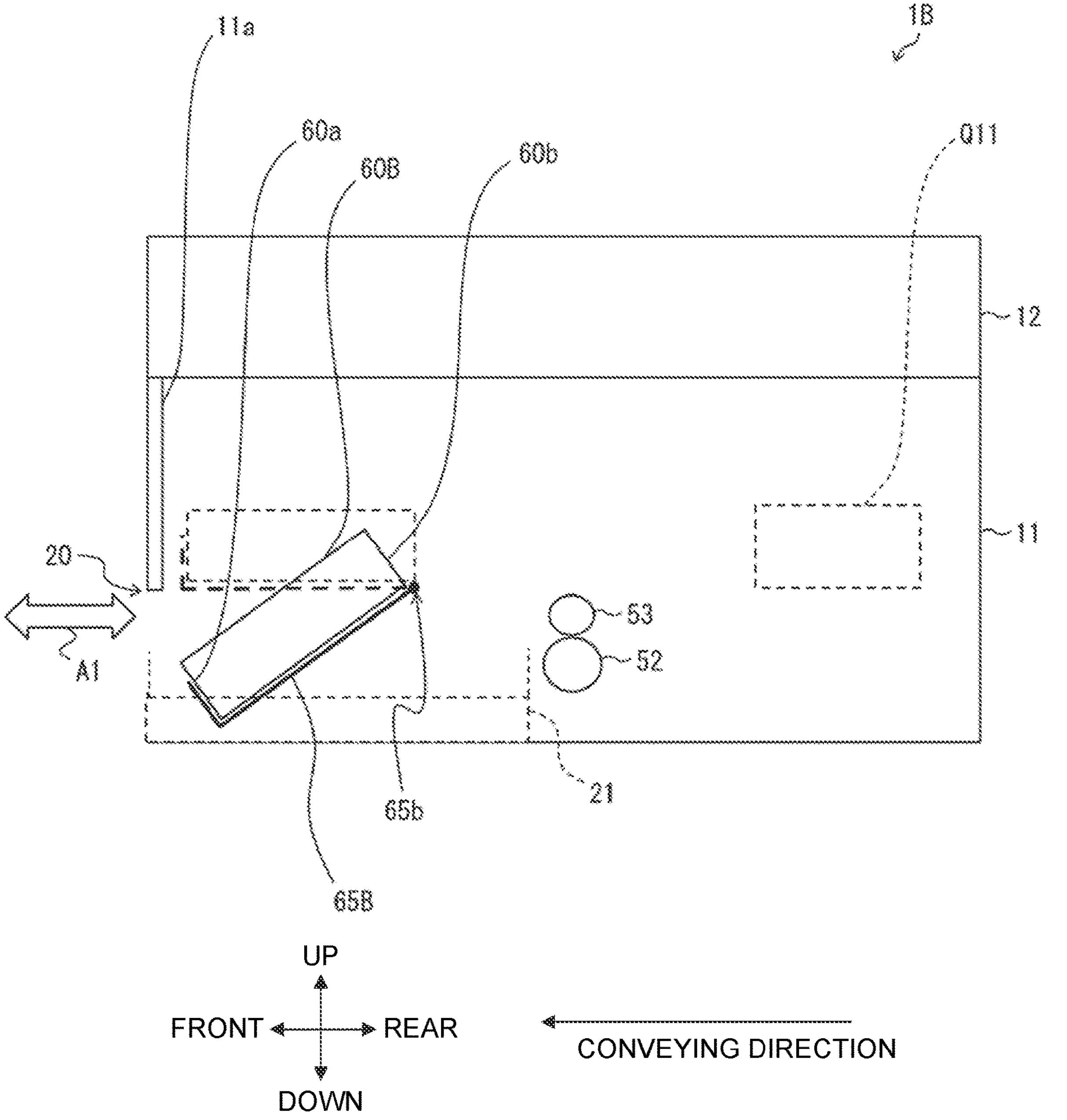
FIG. 14 is a schematic view seeing the ink-jet printer from right of the ink-jet printer.

FIG. 13 is a view seeing an area around the recording unit 4 of the ink-jet printer 1B according to the third embodiment from above. FIG. 14 is a schematic view seeing the ink-jet printer 1B from right of the ink-jet printer 1B. The waste liquid box 60B of the ink-jet printer 1B is arranged in right of the operation panel 13. The waste liquid box 60B may be arranged at a position where the waste liquid box 60B is overlapped with the operation panel 13 in the front-rear direction. As depicted in FIG. 14, the area in front of the waste liquid box 60B is covered by the front-surface 11*a* of the housing 11.

The method of inserting and drawing the waste liquid box 60B with respect to the housing 11 is same as the method of inserting and drawing according to the second embodiment (the method described related to the first to third configuration examples described above). That is, the waste liquid box 60B is inserted into and drawn from the housing 11 through an opening formed by opening at least a portion of the supporting part 65B supporting the waste liquid box 60B.

FOURTH EMBODIMENT

An ink-jet printer 1C according to the fourth embodiment of the present disclosure will be described with reference to the drawings. Note that, for the convenience of the description, members having functions same as those of the members described in the above first embodiment, the second embodiment and/or the third embodiment, will be indicated by referential numerals same as those of the members in the first embodiment, the second embodiment, and/or the third embodiment, and description therefor will not be repeated.

Figure 15:
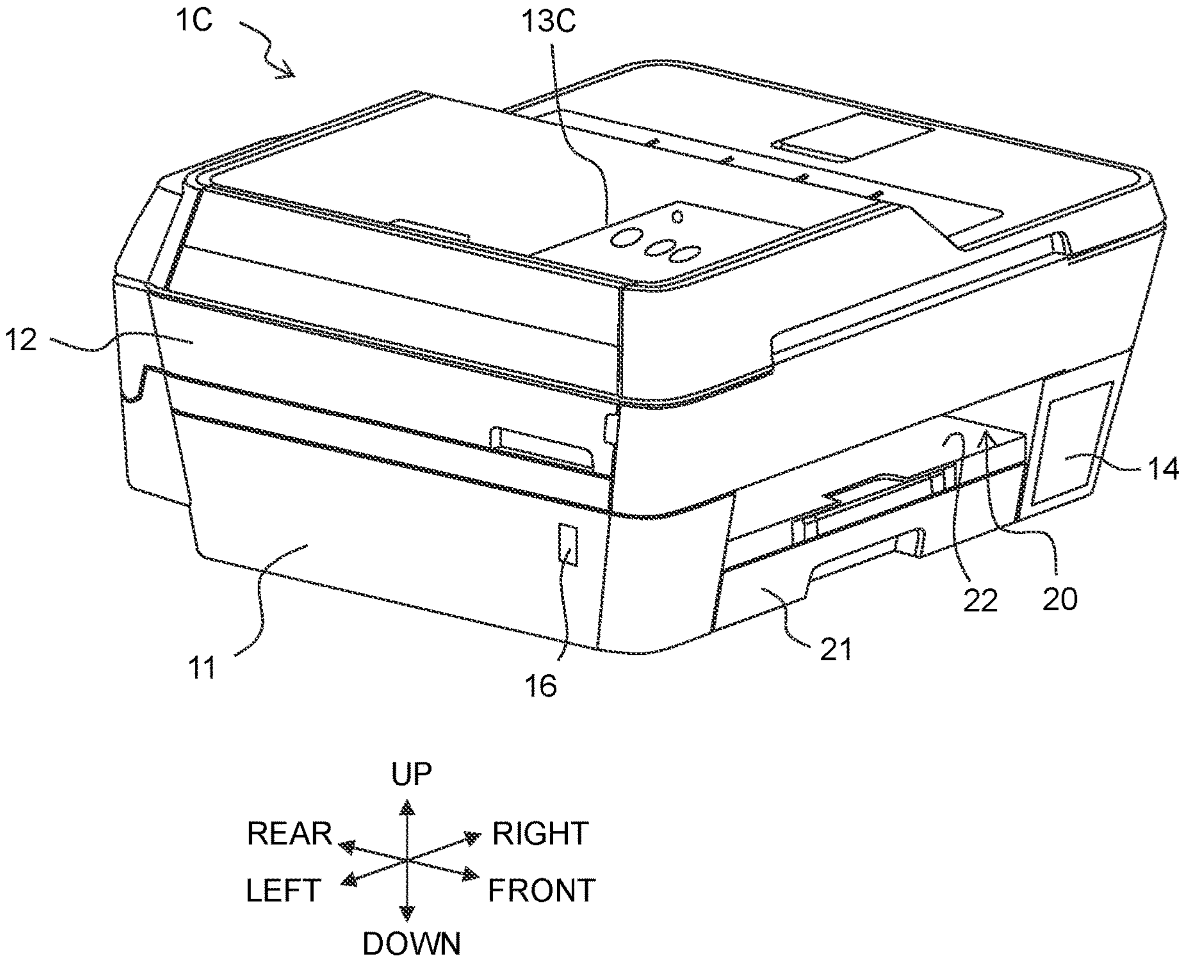
FIG. 15 is an example of an outside perspective view of an ink-jet printer.

FIG. 15 is an example of outside perspective view of the ink-jet printer 1C according to the fourth embodiment. The operating panel 13C of the ink-jet printer 1C is provided on the upper-surface of the ink-jet printer 1C. The waste liquid box 60 of the ink-jet printer 1C is arranged in rear of the front-surface of the housing 11 like the third embodiment.

The method of inserting and drawing the waste liquid box 60 with respect to the housing 11 is same as the method of inserting and drawing according to the second embodiment (the method described related to the first to third configurations described above). That is, the waste liquid box 60 is inserted into and drawn from the housing 11 through an opening formed by opening at least a portion of the supporting part (depiction omitted) supporting the waste liquid box 60.

MODIFIED EXAMPLES

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

First Modified Example

Figure 16:
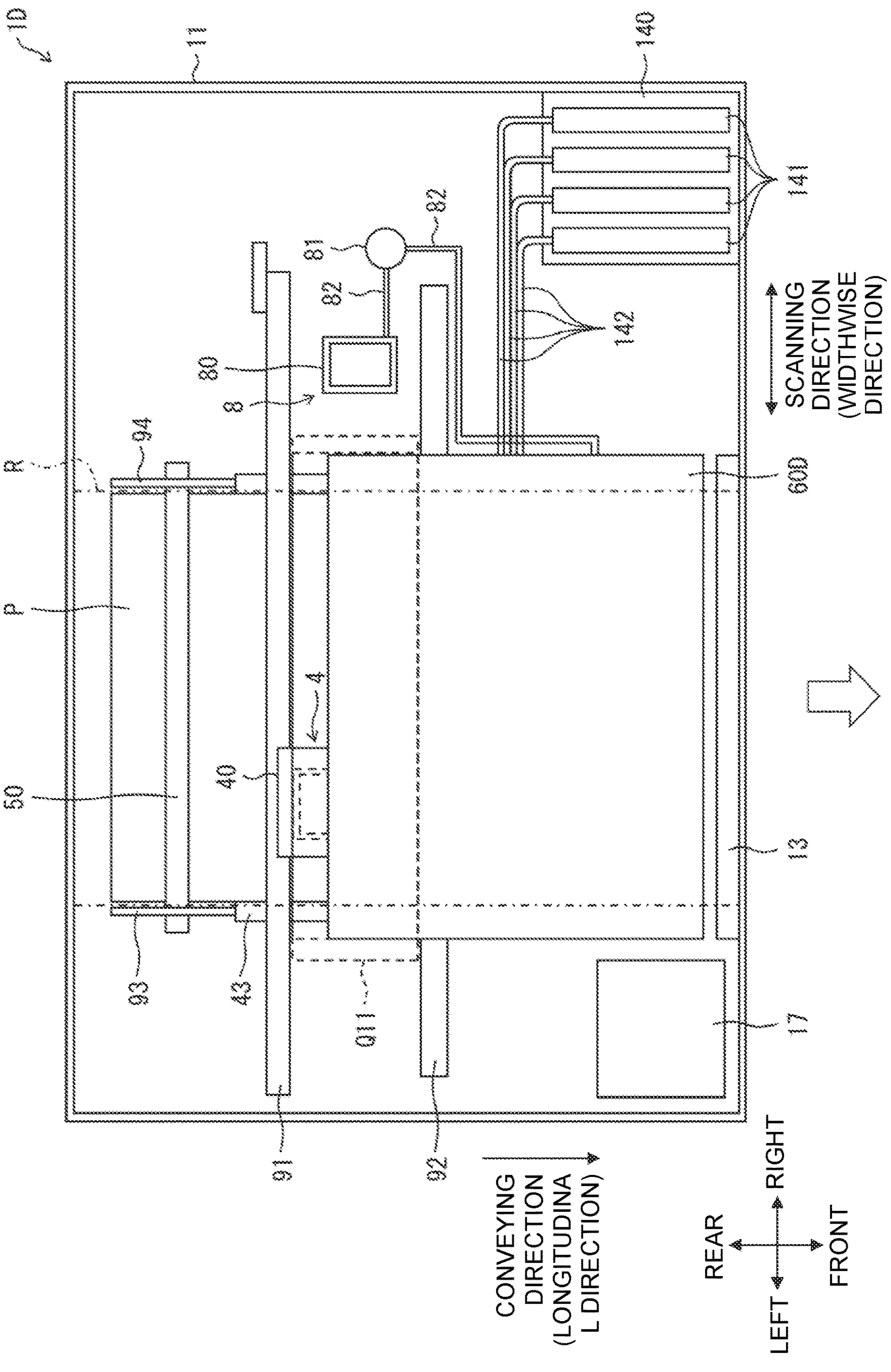
FIG. 16 is a view seeing an area around a recording unit of an ink-jet printer from above.
Figure 17:
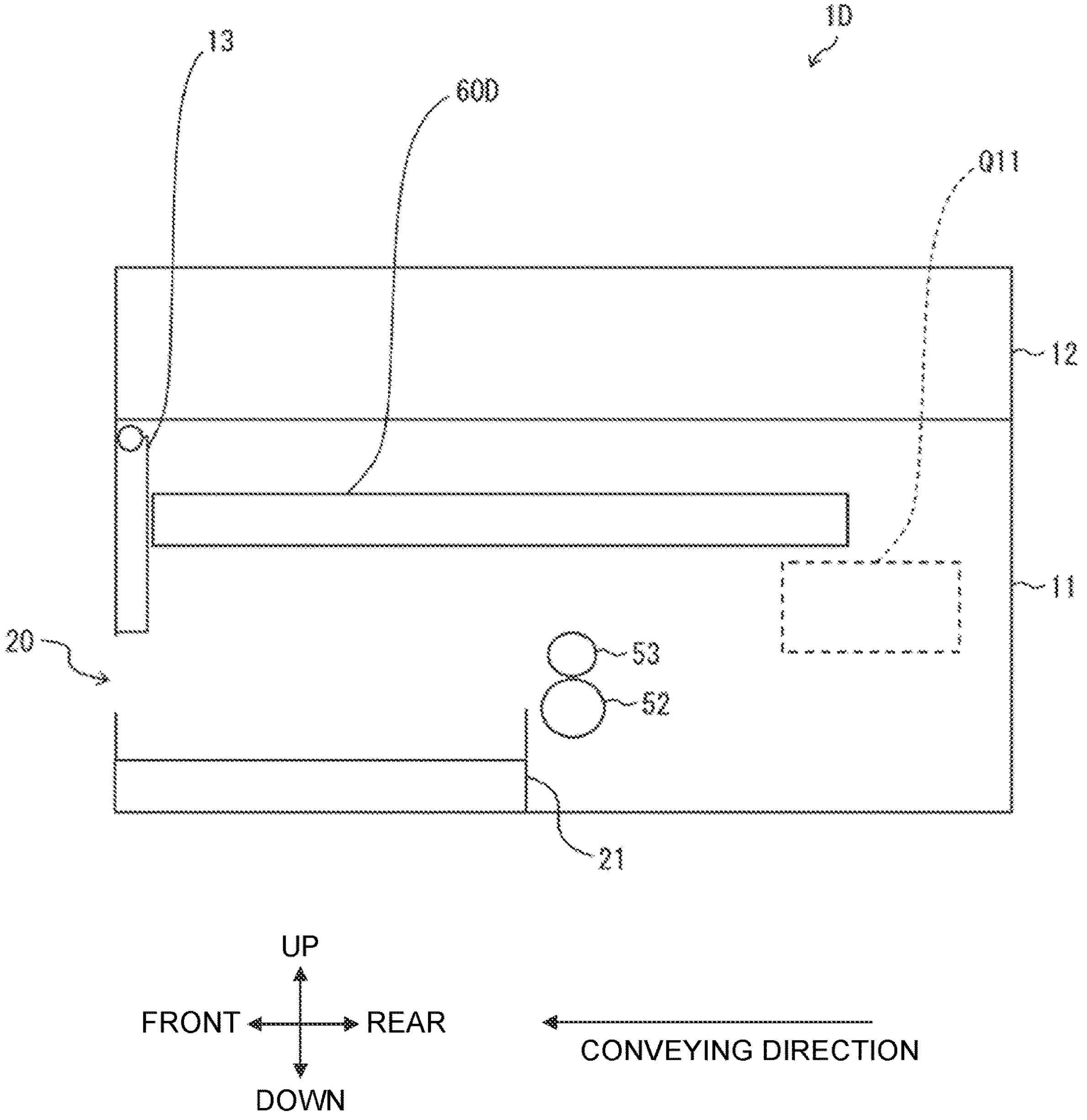
FIG. 17 is a schematic view seeing the ink-jet printer from right of the ink-jet printer.

In the above embodiments, configurations in which the rear-surface of the waste liquid box 60 is positioned in front of the printing area Q11 is described (FIG. 3 etc.). The positional relationship between the waste liquid box and the printing area is not limited to the example depicted in FIG. 3. FIG. 16 is a view depicting an internal configuration of an area around the recording unit 4 of an ink-jet printer 1D according to the first modified example. FIG. 17 is a schematic view seeing the ink-jet printer 1D according to the first modified example from right of the ink-jet printer 1D. As depicted in FIG. 16 and FIG. 17, the rear surface of the waste liquid box 60D is positioned in rear of the front-end of the printing area Q11.

Second Modified Example

Figure 18:
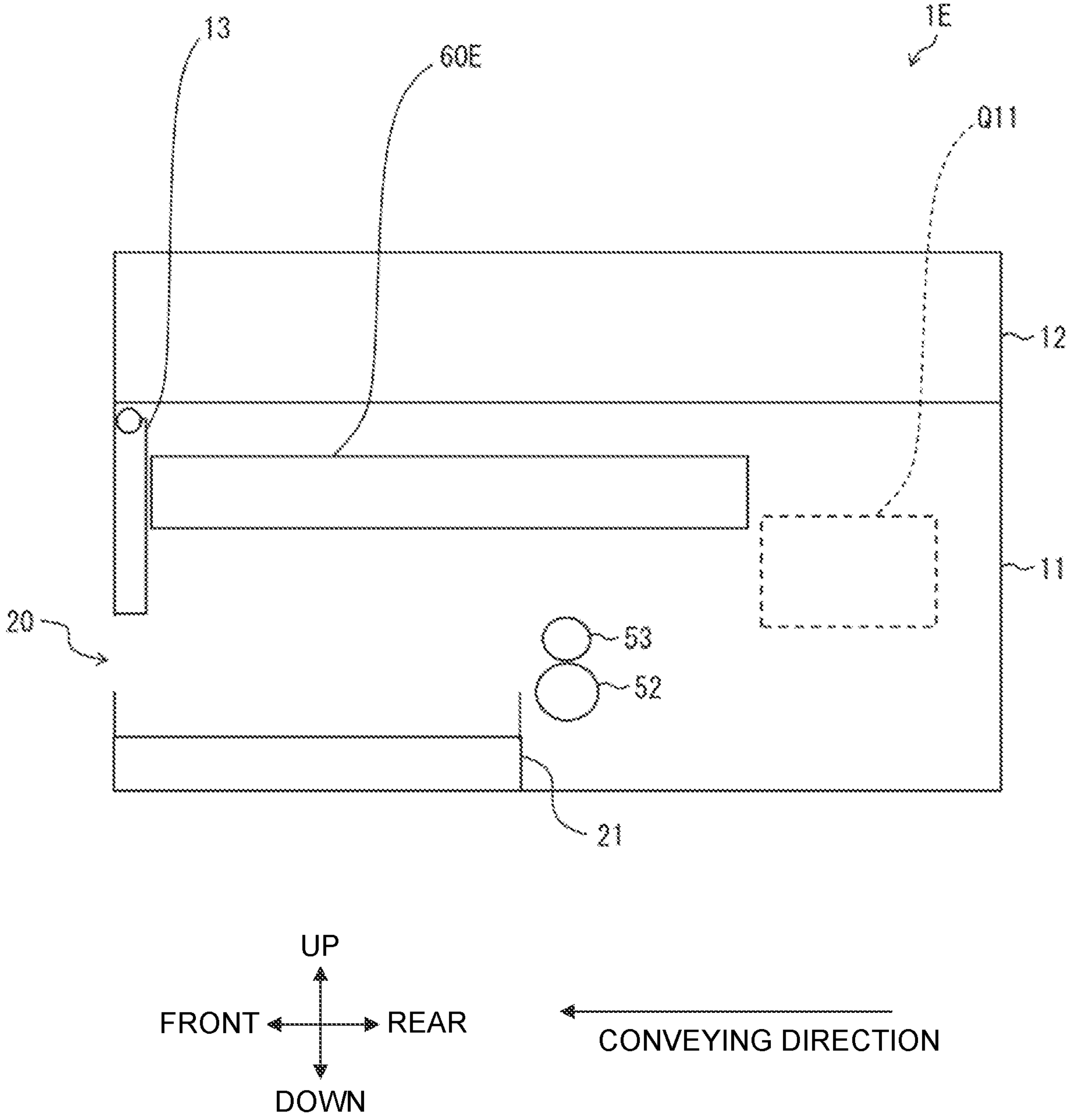
FIG. 18 is a schematic view seeing an ink-jet printer from right of the ink-jet printer.

The positional relationship between the waste liquid box and the printing area is not limited to those described above, and may be that depicted in FIG. 18. FIG. 18 is a schematic view seeing an ink-jet printer 1E according to the second modified example from right of the ink-jet printer 1E. In the example of FIG. 18, the rear-surface of the waste liquid box 60E is positioned in front of the printing area Q11. More specifically, the waste liquid box 60E is configured such that the waste liquid box 60E is longer than the waste liquid box 60 of the first embodiment in the front-rear direction. Further, as depicted in FIG. 18, the printing area Q11 and the waste liquid box 60E can be arranged at positions in which the printing area Q11 and the waste liquid box 60E are arranged side by side in side view (as seen in the left-right direction), because the rear-surface of the waste liquid box 60E is positioned in front of the printing area Q11. With this, the product of the ink-jet printer 1E can be downsized in the up-down direction.

Third Modified Example

Figure 19:
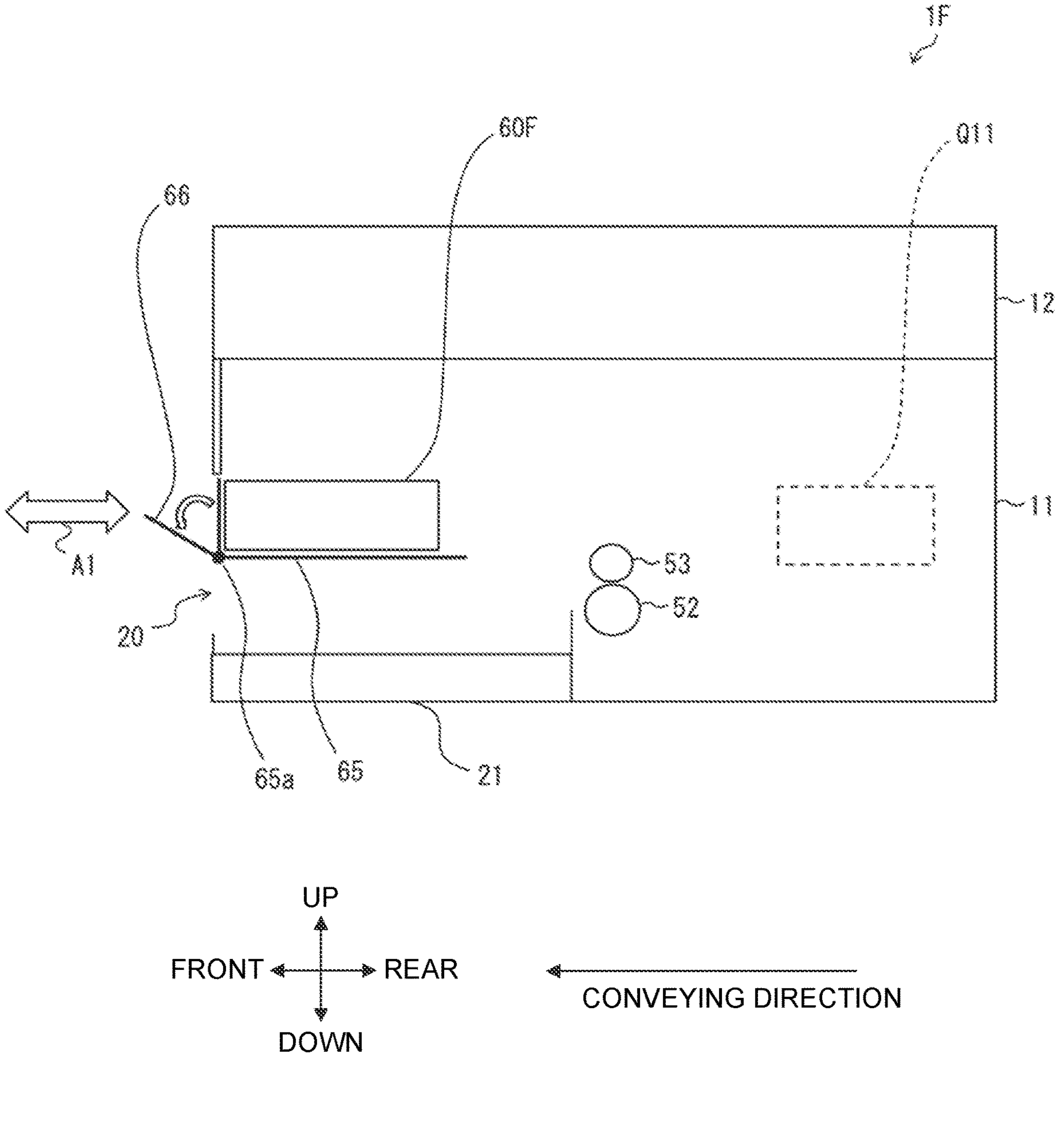
FIG. 19 is a schematic view seeing an ink-jet printer from right of the ink-jet printer.

In the second to fourth embodiments described above, the configuration in which the waste liquid box is inserted or drawn with respect to the housing 11 through the opening formed by opening at least a portion of the supporting part is described. The configuration related to the inserting and drawing of the waste liquid box is not limited to those described above, and may be other configurations. FIG. 19 is a schematic view seeing the ink-jet printer 1F according to the third modified example from right of the ink-jet printer 1F. The ink-jet printer 1F includes the waste liquid box cover 66. The waste liquid box cover 66 is provided in the front-surface of the housing 11 such that the waste liquid cover 66 can be opened and closed. The waste liquid box cover 66 rotates about a rotation axis being the end 65*a* of the supporting part 65. The waste liquid box 60F is inserted into and drawn from the housing 11 via the opening formed by opening the waste box cover 66.

Fourth Modified Example

Figure 20:
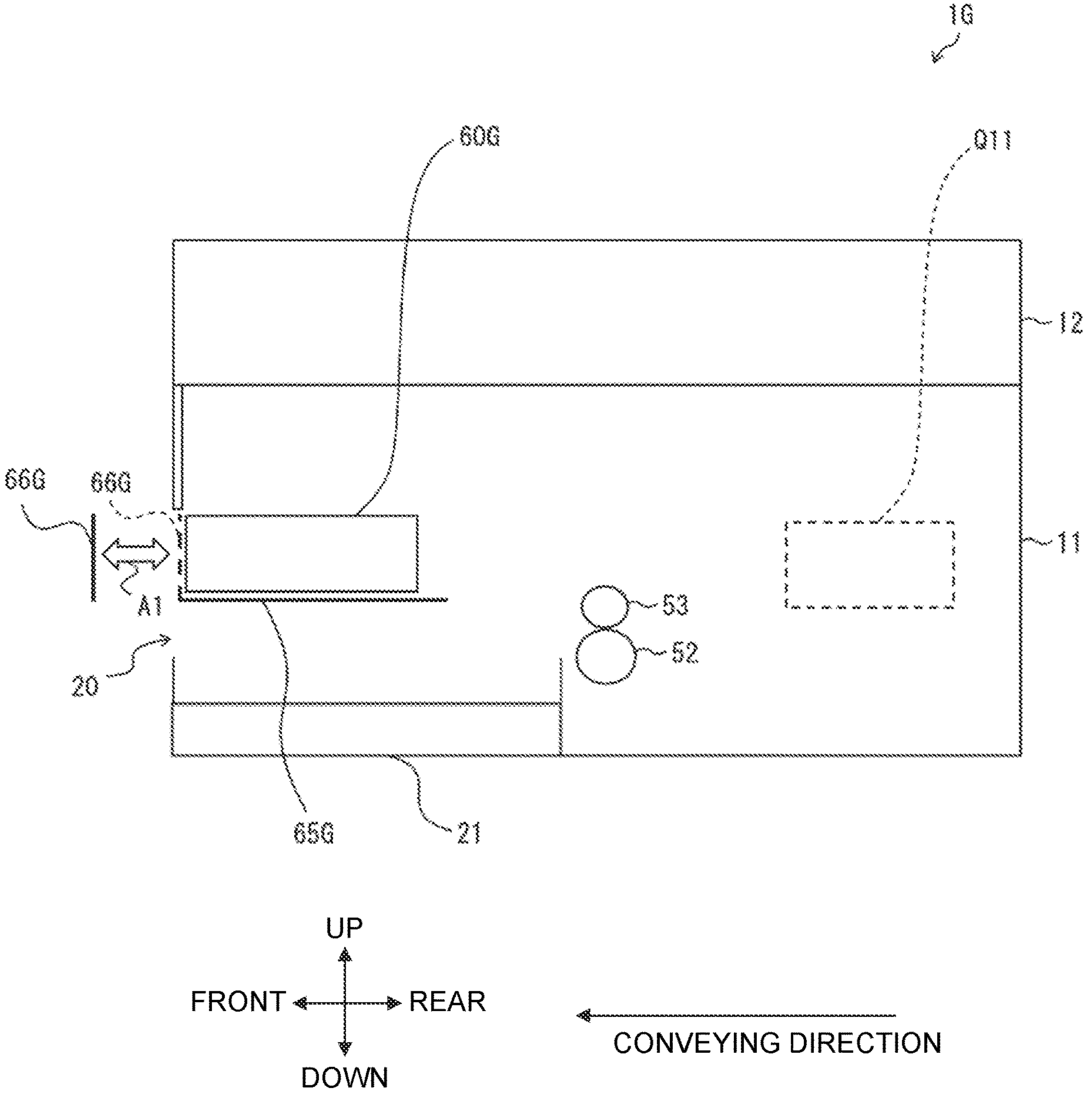
FIG. 20 is a schematic view seeing an ink-jet printer from right of the ink-jet printer.

As another example, the configuration related to inserting and drawing of the waste liquid box can be the configuration depicted in FIG. 20. FIG. 20 is schematic view seeing the ink-jet printer 1G according to the fourth modified embodiment from right of the ink-jet printer 1G. In this example, the ink-jet printer 1G includes a waste liquid box cover 66G. The waste liquid box cover 66G is provided in the front-surface of the housing 11 such that the waste liquid box cover 66G is detachable from the front-surface of the housing 11. The waste liquid box 60G is inserted into and drawn from the housing 11 through an opening formed by detaching the waste liquid box cover 66G from the housing 11.

Fifth Modified Example

Figure 21:
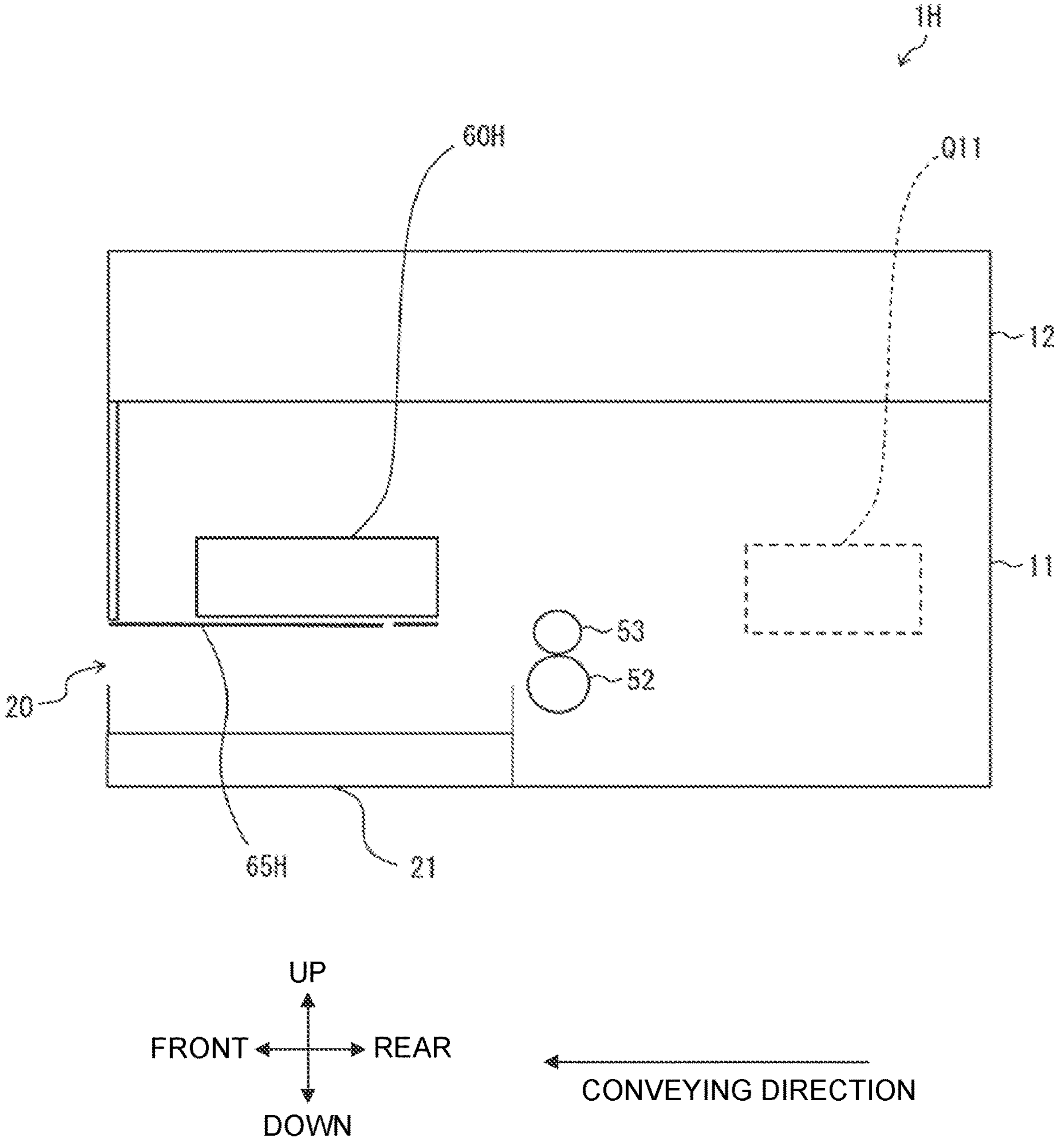
FIG. 21 is a schematic view seeing an ink-jet printer from right of the ink-jet printer.
Figure 22:
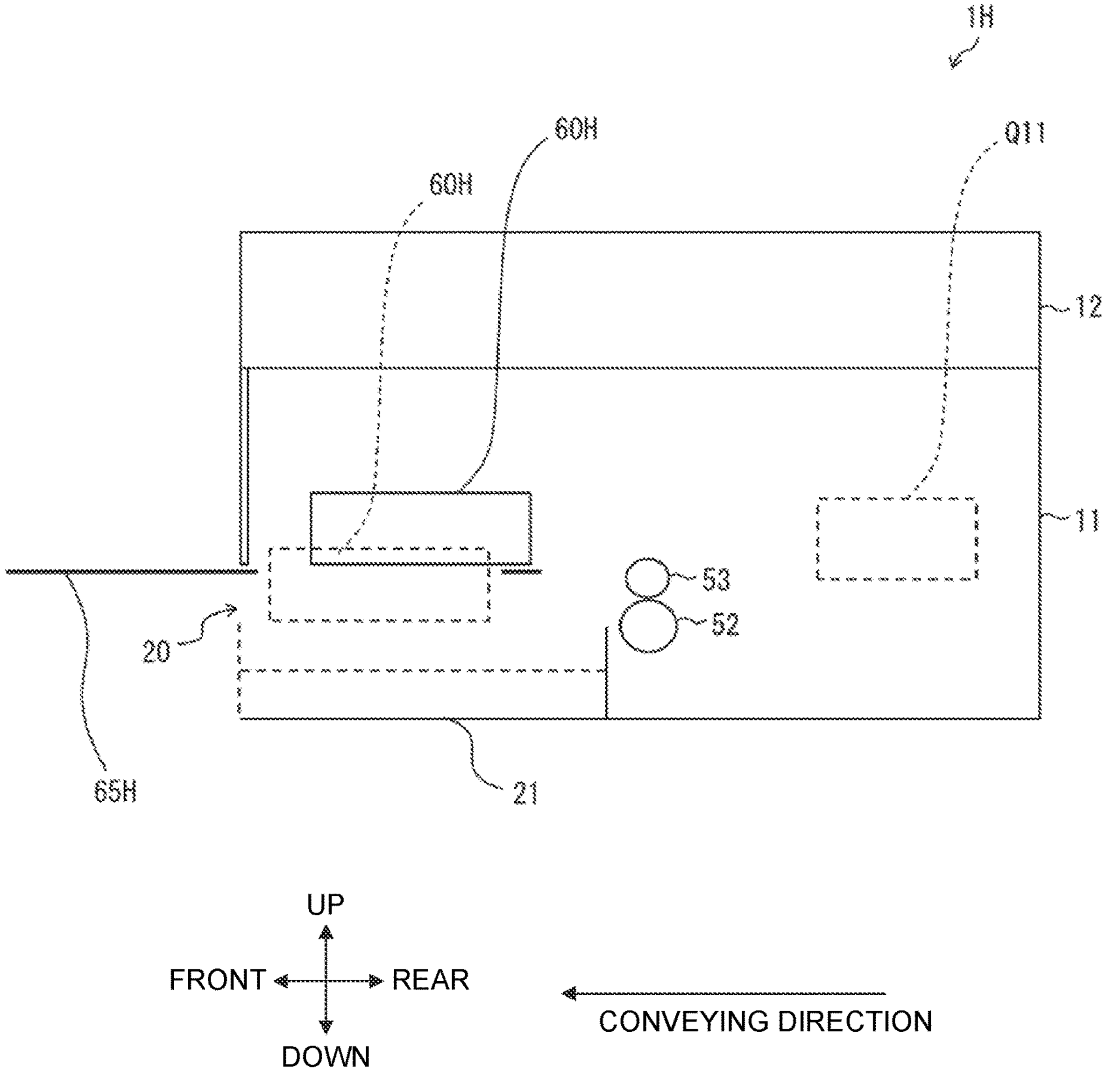
FIG. 22 is a schematic view seeing the ink-jet printer from right of the ink-jet printer.

As another example, the configuration related to inserting and drawing of the waste liquid box can be the configuration depicted in FIGS. 21 and 22. FIGS. 21 and 22 are schematic views seeing the ink-jet printer 1H according to the fifth modified example from right of the ink-jet printer 1H. In this example, the supporting part 65H is provided in the housing 11 such that the supporting part 65H is detachable from the housing 11. The waste liquid box 60H is inserted into and drawn from the housing 11 through an opening formed by detaching the supporting part 65H from the housing 11.

Other Modified Examples

In the embodiments and modified examples described above, the liquid discharging apparatus is the ink-jet printer 1, 1A, 1B, 1C, 1D, 1E, 1F, 1G, or 1H (hereinbelow, referred to as "the ink-jet printer 1, etc.". However, there is no limitation thereto. Other than the ink-jet printer 1 etc., the liquid discharging apparatus may be MFP (Multi-Function Peripheral) having multiple functions such as a printing function, a scanning function, a copying function, and a facsimile function etc.

In the embodiments and the modified examples described above, the ink-jet printer 1 etc. is an ink-jet printer of serial system configured to discharge the ink L from the nozzles 42 while moving the carriage 40 in the scanning direction. However, there is no limitation thereto. For example, the ink-jet printer 1 etc. may be an ink-jet printer of line system in which the liquid discharging head 41 is fixed to the housing 11 so as to extend over the total length of the sheet P in the scanning direction.

In the embodiments and the modified examples described above, the waste liquid box 60B, 60D, 60E, 60F, 60G, and 60H (hereinbelow, referred to as "the waste box 60 etc.") are arranged above both of the conveying roller 50 and the ejecting roller 52. However, there is no limitation thereto. For example, the waste liquid box 60 etc. may be arranged below one of the conveying roller 50 and the ejecting roller 52. The waste liquid box 60 etc. may be arranged below the conveying roller 50 and the ejecting roller 52.

In the embodiments and modified examples described above, the waste liquid box 60 etc. is arranged below the two guide rails 91, 92. However, there is no limitation thereto. For example, the waste liquid box 60 etc. may be arranged below one of two guide rails 91, 92. Further, the waste liquid box 60 etc. may be arranged above the two guide rails 91, 92.

In the embodiments and the modified examples described above, the waste liquid box etc. is configured to store the waste liquid discharged (drained) from the nozzles 42 in the maintenance process performed by the maintenance unit 8. However, there is no limitation thereto. For example, the ink-jet printer 1, etc. may include a flushing unit configured to perform a flushing process. Here, the flushing process is an operation, performed separately from the discharging (draining) of the ink L to the sheet P, in which the ink L is discharged (drained) from the nozzles 42 to the waste liquid guide 71 by driving the liquid discharging head 41 in a state that the carriage 40 is moved to a position where the carriage 40 faces the flushing unit. The waste liquid box 60 etc. may be configured to store the waste liquid caused in a case that a cleaning member other than the maintenance unit 8 and the flushing unit is used.

In the embodiments and the modified examples described above, the reading unit 12 is provided such that the reading unit 12 is rotatable relative to the housing 11 about a rotation axis being the hinge (depiction omitted). However, there is no limitation thereto. For example, the reading unit 12 may be configured such that the reading unit 12 is positioned above the waste liquid box 60 in a state that the waste liquid box 60 is installed in the housing 11, and the reading unit 12 cannot be opened upwardly. In such a manner, even if the reading unit 12 is configured such that the reading unit 12 cannot be opened upwardly, the waste liquid box 60 can be inserted into and drawn from the housing 11 via the front-surface of the housing 11. That is, even if the access to the waste liquid box 60 from the upper-surface of the housing 11 is difficult, it is possible to insert and draw the waste liquid box 60 with respect to the housing 11.

The present disclosure is not limited to the embodiments described above, and various modification is possible within a range indicated by the claims. Any configuration obtained by appropriately combining technical means disclosed in the embodiments is included in the scope of the present disclosure.

What is claimed is:

1. A liquid discharging apparatus comprising:
- a housing;
- a head having a nozzle configured to discharge a liquid to a printing medium; and
- a waste liquid box configured to be inserted into and drawn from the housing, the waste liquid box being configured to store a waste liquid of the liquid, wherein:
- the housing has a first opening configured to eject the printing medium via the first opening, the first opening being arranged in a front-surface of the housing, a front-rear direction of the housing being a direction parallel with a conveying direction along which the printing medium is conveyed;
- the waste liquid box is configured to be inserted into and drawn from the housing via the front-surface of the housing;
- in a state that the waste liquid box is installed in the housing:
  - at least a portion of the waste liquid box is positioned in front of a printing area being an area in which the nozzle of the head is arranged;
  - the front-surface of the housing is configured such that a portion of the front-surface is to be opened so as to form a second opening; and
  - the waste liquid box is configured to be inserted into and drawn from the housing through the second opening.

2. The liquid discharging apparatus according to claim 1, wherein the printing area is an area in which the nozzle of the head moves in a scanning movement.

3. The liquid discharging apparatus according to claim 1, wherein a lower surface of the waste liquid box is positioned above a pinching position where an ejecting roller pair pinches the printing medium, the ejecting roller pair being configured to eject the printing medium while pinching the printing medium.

4. The liquid discharging apparatus according to claim 1, wherein, in the state that the waste liquid box is installed in the housing, a rear-surface of the waste liquid box is positioned in front of the printing area.

5. The liquid discharging apparatus according to claim 1, further comprising an operation panel arranged in the front-surface of the housing, the operation panel being configured such that an operation of a user is inputted to the operation panel, wherein:
- the operation panel is configured to rotate with respect to the housing, and
- a state in which the waste liquid box is to be inserted into and drawn from the housing through the second opening is brought by rotating the operation panel.

6. The liquid discharging apparatus according to claim 1, further comprising a support configured to support a lower-surface of the waste liquid box, wherein:
- the support is configured such that at least a portion of the support is moved so as to form an opening, and
- the waste liquid box is configured to be inserted into and drawn from the housing through the opening.

7. The liquid discharging apparatus according to claim 6, further comprising a waste liquid channel configured to transfer the waste liquid to the waste liquid box,
- wherein the support is arranged such that at least a joint is covered from below by the support, the joint connecting the waste liquid channel and the waste liquid box.

8. The liquid discharging apparatus according to claim 6, wherein the support is configured to move downwardly so as to form the opening.

9. The liquid discharging apparatus according to claim 6, wherein the at least the portion of the support is configured to rotate so as to form the opening.

10. The liquid discharging apparatus according to claim 1, wherein, in the state that the waste liquid box is installed in the housing, the waste liquid box is positioned between a first area and a second area in a left-right direction orthogonal to the front-rear direction, the first area being defined in right of the waste liquid box so as to have a predetermined range, the second area being defined in left of the waste liquid box so as to have a predetermined range.

11. The liquid discharging apparatus according to claim 10, wherein a liquid container configured to contain the liquid to be supplied to the head is arranged in the first area and/or the second area.

12. The liquid discharging apparatus according to claim 1, wherein, in the state that the waste liquid box is installed in the housing, a front-surface of the waste liquid box is positioned in rear of the front-surface of the housing.

13. The liquid discharging apparatus according to claim 1, further comprising a reader configured to read an image, wherein:

in the state that the waste liquid box is installed in the housing, the reader is positioned above the waste liquid box, and the reader is configured not to be opened upwardly.

14. A liquid discharging apparatus comprising:

a housing;

a head having a nozzle configured to discharge a liquid to a printing medium;

a waste liquid box configured to be inserted into and drawn from the housing, the waste liquid box being configured to store a waste liquid of the liquid; and a support configured to support a lower-surface of the waste liquid box, wherein:

the housing has a first opening configured to eject the printing medium via the first opening, the first opening being arranged in a front-surface of the housing, a front-rear direction of the housing being a direction parallel with a conveying direction along which the printing medium is conveyed;

the waste liquid box is configured to be inserted into and drawn from the housing via the front-surface of the housing;

in a state that the waste liquid box is installed in the housing, at least a portion of the waste liquid box is positioned in front of a printing area being an area in which the nozzle of the head is arranged;

the support is configured such that at least a portion of the support is moved so as to form an opening; and the waste liquid box is configured to be inserted into and drawn from the housing through the opening.

15. The liquid discharging apparatus according to claim 14, further comprising a waste liquid channel configured to transfer the waste liquid to the waste liquid box, wherein the support is arranged such that at least a joint is covered from below by the support, the joint connecting the waste liquid channel and the waste liquid box.

16. The liquid discharging apparatus according to claim 14, wherein the support is configured to move downwardly so as to form the opening.

17. The liquid discharging apparatus according to claim 14, wherein the at least the portion of the support is configured to rotate so as to form the opening.

18. A liquid discharging apparatus comprising:

a housing;

a head having a nozzle configured to discharge a liquid to a printing medium; and a waste liquid box configured to be inserted into and drawn from the housing, the waste liquid box being configured to store a waste liquid of the liquid, wherein:

the housing has a first opening configured to eject the printing medium via the first opening, the first opening being arranged in a front-surface of the housing, a front-rear direction of the housing being a direction parallel with a conveying direction along which the printing medium is conveyed;

the waste liquid box is configured to be inserted into and drawn from the housing via the front-surface of the housing;

in a state that the waste liquid box is installed in the housing, at least a portion of the waste liquid box is positioned in front of a printing area being an area in which the nozzle of the head is arranged; and in the state that the waste liquid box is installed in the housing, the waste liquid box is positioned between a first area and a second area in a left-right direction orthogonal to the front-rear direction, the first area being defined in right of the waste liquid box so as to have a predetermined range, the second area being defined in left of the waste liquid box so as to have a predetermined range.

19. The liquid discharging apparatus according to claim 18, wherein a liquid container configured to contain the liquid to be supplied to the head is arranged in the first area and/or the second area.

20. A liquid discharging apparatus comprising:

a housing;

a head having a nozzle configured to discharge a liquid to a printing medium;

a waste liquid box configured to be inserted into and drawn from the housing, the waste liquid box being configured to store a waste liquid of the liquid; and a reader configured to read an image, wherein:

the housing has a first opening configured to eject the printing medium via the first opening, the first opening being arranged in a front-surface of the housing, a front-rear direction of the housing being a direction parallel with a conveying direction along which the printing medium is conveyed;

the waste liquid box is configured to be inserted into and drawn from the housing via the front-surface of the housing;

in a state that the waste liquid box is installed in the housing, at least a portion of the waste liquid box is positioned in front of a printing area being an area in which the nozzle of the head is arranged;

in the state that the waste liquid box is installed in the housing, the reader is positioned above the waste liquid box; and the reader is configured not to be opened upwardly.

* * * * *